US012586088B2

(12) United States Patent
Song et al.

(10) Patent No.: US 12,586,088 B2
(45) Date of Patent: \*Mar. 24, 2026

(54) ANTI-FRAUD FINANCIAL TRANSACTIONS SYSTEM

(71) Applicant: APEX TECHLINK, INC., Glendale, CA (US)

(72) Inventors: Alexander Song, Porter Ranch, CA (US); Yuh-Shen Song, Porter Ranch, CA (US); Catherine Lew, Porter Ranch, CA (US)

(73) Assignee: APEX TECHLINK, INC., Glendale, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/099,182

(22) Filed: Jan. 19, 2023

(65) Prior Publication Data

US 2023/0153835 A1      May 18, 2023

Related U.S. Application Data

(63) Continuation of application No. 13/656,611, filed on Oct. 19, 2012, now Pat. No. 11,580,562.

(60) Provisional application No. 61/628,114, filed on Oct. 25, 2011.

(51) Int. Cl.
*G06Q 30/02* (2023.01)

(52) U.S. Cl.
CPC ................................... *G06Q 30/02* (2013.01)

(58) Field of Classification Search
CPC ........................... G06Q 30/02; G06Q 30/0261

USPC ....................................................... 705/14.58
See application file for complete search history.

(56) References Cited

U.S. PATENT DOCUMENTS

| | | | |
|---|---|---|---|
| 7,593,862 B2 * | 9/2009 | Mankoff | G06Q 30/0215 705/14.1 |
| 7,752,450 B1 * | 7/2010 | Palmer | H04L 63/0838 726/21 |
| 8,195,576 B1 * | 6/2012 | Grigg | G06Q 20/3278 726/10 |
| 8,700,729 B2 | 4/2014 | Dua | |

(Continued)

OTHER PUBLICATIONS

Reardon, Marguerite, Visa vs. Google Wallet in mobile payments, CNET [online], dated Aug. 25, 2011, downloaded Sep. 14, 2023 from https://www.cnet.com/tech/mobile/visa-vs-google-wallet-in-mobile-payments/ (Year: 2011).*

(Continued)

*Primary Examiner* — Scott D Gartland
(74) *Attorney, Agent, or Firm* — Seyfarth Shaw LLP

(57) ABSTRACT

A method for conducting a transaction with a consumer device includes receiving user input selecting a store as a party to the transaction with a consumer associated with the consumer device. The method also includes transmitting, to the account computer system, first identification information of the store and second identification information of the consumer device. The method further includes receiving, from the account computer system, a passcode based on transmitting the first identification information of the store. The method also includes receiving, from the account computer system, a payment amount due. The method still further includes transmitting the passcode to the store to finalize the transaction.

14 Claims, 10 Drawing Sheets

500  Computer System of Anti Fraud Financial Transactions System (AFTS)

400  Online Merchant

300  Retail Store

600  Network

100  Consumer

200  Financial Institution

(56) References Cited

U.S. PATENT DOCUMENTS

| | | | | | |
|---|---|---|---|---|---|
| 11,580,562 | B2 * | 2/2023 | Song | | G06Q 30/02 |
| 2002/0179703 | A1 * | 12/2002 | Allen | | G06Q 30/0238 |
| | | | | | 235/381 |
| 2003/0078029 | A1 * | 4/2003 | Petite | | H04M 11/04 |
| | | | | | 455/404.1 |
| 2003/0131251 | A1 * | 7/2003 | Fetkovich | | H04N 21/25833 |
| | | | | | 713/193 |
| 2003/0230630 | A1 * | 12/2003 | Whipple | | G06K 7/1095 |
| | | | | | 235/462.01 |
| 2004/0098304 | A1 * | 5/2004 | Truong | | G06Q 30/02 |
| | | | | | 705/14.1 |
| 2004/0172531 | A1 * | 9/2004 | Little | | G06F 21/335 |
| | | | | | 713/155 |
| 2005/0043997 | A1 * | 2/2005 | Sahota | | G06Q 20/388 |
| | | | | | 705/16 |
| 2005/0211771 | A1 * | 9/2005 | Onozu | | G06Q 20/3274 |
| | | | | | 705/16 |
| 2006/0235746 | A1 | 10/2006 | Hammond et al. | | |
| 2007/0288497 | A1 * | 12/2007 | Droznin | | G06Q 30/0259 |
| 2007/0294403 | A1 * | 12/2007 | Verona | | G06F 21/6245 |
| | | | | | 709/225 |
| 2008/0142599 | A1 * | 6/2008 | Benillouche | | G06Q 30/02 |
| | | | | | 235/462.41 |
| 2008/0222002 | A1 | 9/2008 | Hu et al. | | |
| 2008/0270163 | A1 * | 10/2008 | Green | | G06Q 30/02 |
| | | | | | 705/14.4 |
| 2009/0106115 | A1 | 4/2009 | James et al. | | |
| 2009/0319797 | A1 * | 12/2009 | Tornqvist | | G06Q 20/3255 |
| | | | | | 713/168 |
| 2010/0076950 | A1 * | 3/2010 | Kenedy | | G06Q 30/02 |
| | | | | | 707/706 |
| 2010/0082447 | A1 * | 4/2010 | Lin | | G06Q 30/0601 |
| | | | | | 705/26.1 |
| 2010/0083322 | A1 * | 4/2010 | Rouse | | H04N 7/17318 |
| | | | | | 725/87 |
| 2010/0250358 | A1 | 9/2010 | Elkins, II et al. | | |
| 2010/0250410 | A1 * | 9/2010 | Song | | G06Q 20/3821 |
| | | | | | 726/28 |
| 2011/0022483 | A1 | 1/2011 | Hammond | | |
| 2011/0071896 | A1 * | 3/2011 | Dasher | | G06Q 30/06 |
| | | | | | 705/14.1 |
| 2011/0137804 | A1 * | 6/2011 | Peterson | | G06Q 30/0603 |
| | | | | | 705/77 |
| 2011/0238473 | A1 * | 9/2011 | Sankolli | | G06Q 20/38215 |
| | | | | | 235/494 |
| 2011/0276371 | A1 * | 11/2011 | Norcross | | G06Q 30/0207 |
| | | | | | 705/14.1 |
| 2011/0302018 | A1 | 12/2011 | Norcross et al. | | |
| 2012/0191817 | A1 * | 7/2012 | Sayan | | G06Q 30/0639 |
| | | | | | 709/219 |
| 2012/0226542 | A1 * | 9/2012 | Blosser | | G06Q 30/02 |
| | | | | | 705/14.1 |
| 2013/0046625 | A1 * | 2/2013 | Grigg | | G06Q 30/06 |
| | | | | | 705/21 |
| 2013/0124288 | A1 * | 5/2013 | Carter | | G06Q 30/0207 |
| | | | | | 705/14.23 |

OTHER PUBLICATIONS

Lonthoff et al., Mobile Location-Based Couponing—Use Cases, Business Scenarios and Architecture, IADIS International Conference Wireless Applications and Computing 2007, ISBN: 978-972-8924-40-9 © 2007 IADIS, downloaded Sep. 14, 2023 (Year: 2007).*

StackOverflow forum—What is the simplest and most robust way to get the user's current location on Android?, asked by Emmby on Jun. 29, 2010, answered by Fedor on Jun. 30, 2010 (Year: 2010).*

Shankar et al., Mobile Marketing in the Retailing Environment: Current Insights and Future Research Avenues, dated Feb. 2010, downloaded from https://citeseerx.ist.psu.edu/document?repid=rep1&type=pdf&doi=6fe605247dca150ba32039a43780c5e2d6abdf14, Feb. 28, 2024 (Year: 2010).*

Munson et al., Location-based notification as a general-purpose service, WMC '02: Proceedings of the 2nd international workshop on Mobile commerce, Sep. 2002, pp. 40-44, https://doi.org/10.1145/570705.570713, downloaded Mar. 24, 2024 from https://dl.acm.org/doi/pdf/10.1145/570705.570713 (Year: 2002).*

Smart Card Alliance (no specific author identified), Security of Proximity Mobile Payments, dated May 2009, downloaded Sep. 28, 2022 from https://www.securetechalliance.org/resources/pdf/Security_of_Proximity_Mobile_Payments.pdf (Year: 2009).*

Peterson, Lisa, et al., Location-Based Advertising, downloaded from https://www.mmaglobal.com/files/PetersonMobility_20100217144146.pdf on Nov. 3, 2021, dated Dec. 2009 (Year: 2009).*

International Search Report—PCT/US2012/061719—ISA/KR—Feb. 28, 2013.

Peterson, Lisa, et al., Location-Based Advertising, downloaded from https://www.nnnnaglobal.conn/files/PetersonMobility_20100217144146.pdf on Nov. 3, 2021, dated Dec. 2009 (Year: 2009).

* cited by examiner

Computer System of Anti Fraud Financial Transactions System (AFTS)

300

Retail Store

200

Financial Institution

500

600

Network

100

Consumer

400

Online Merchant

ANTI-FRAUD FINANCIAL TRANSACTIONS SYSTEM

CROSS REFERENCE TO RELATED APPLICATION

This application is a continuation of U.S. patent application Ser. No. 13/656,611, filed on Oct. 19, 2012, and titled "ANTI-FRAUD FINANCIAL TRANSACTIONS SYSTEM," which claims the benefit of U.S. Provisional Patent Application No. 61/628,114, filed on Oct. 25, 2011, and "ANTI-FRAUD MOBILE PAYMENT SYSTEM," the disclosures of which are expressly incorporated by reference herein in their entireties.

TECHNICAL FIELD

The present disclosure relates generally to financial transaction systems. More specifically, the present disclosure enables the conducting of financial transactions without using traditional financial instruments.

BACKGROUND

Traditional financial instruments include credit cards, debit cards, ATM cards, gift cards, stored value cards, prepaid cards, cash, checks, coupons, tokens, tickets, vouchers, certificates, notes, security, etc. These traditional financial instruments can be easily stolen and fabricated. For example, by bribing a waiter in a restaurant, a fraudster can easily steal the card information from a guest of the restaurant. The fraudster can use the stolen card information for paying a nominal fee to numerous background search websites on the Internet, to acquire useful personal information based on the cardholder's name shown on the stolen card. Once this personal information is obtained, a counterfeit card and a counterfeit identification document, such as a driver's license, can be easily fabricated with current technology.

Once a fraudster has stolen or fabricated a financial instrument, the fraudster can quickly conduct many illegal financial transactions before the affected financial institutions, organizations or individuals identify the fraud and disable the financial instrument. Many individuals, organizations and financial institutions have suffered tremendous material losses and damages as a result of fraudulent financial transactions.

In fact, stealing financial instruments is easy today. Many financial institutions and merchants store their clients' personal information, including the information of the financial instruments (e.g., credit cards, debit cards, etc.), in databases. There are many cases where employees of financial institutions, merchants, or consumer report companies steal customers' information, commit fraud, and/or sell the information to fraudsters.

In addition, checks are still one of the most popular financial instruments today. Unfortunately, fabricating a counterfeit check is easier than fabricating a counterfeit card. There are numerous fraud cases related to counterfeit checks that are used together with counterfeit identification documents.

Furthermore, an online merchant cannot easily tell whether a remote consumer has the correct identity. If correct card information, which can be obtained from a stolen card, and a correct billing address, which can be obtained from Internet search websites, are presented, the merchant cannot easily tell whether the remote consumer is actually a fraudster. An experienced fraudster can easily conduct fraudulent online transactions in this manner. As a result, online merchants are exposed to a tremendous amount of monetary losses every year.

Furthermore, mailing new financial instruments to new customers or existing customers when their old financial instruments expire is a major expense to financial institutions. In addition to the huge amount of resources used in this mailing process, these financial instruments can be easily stolen during the mailing process and used to commit fraud.

In summary, fraudulent financial transactions can be easily committed today, and individuals, organizations, merchants, and financial institutions are suffering enormous losses and damages using conventional financial transaction systems.

SUMMARY OF THE DISCLOSURE

The present disclosure enables consumers to conduct financial transactions in a secure manner without using traditional financial instruments, which are easily stolen and/or fabricated.

In one aspect of the present disclosure, consumers can conduct financial transactions without having to carry a traditional financial instrument.

Traditionally, a client of a financial institution is identified by an account number. For example, a credit card has a credit card account number. A check has a checking account number. A stock trading account has a trading account number. An insurance policy holder has a policy number (or an account number). This is the traditional way for financial institutions to identify and manage billions of clients without any confusion.

Because an account number is generally very long, clients are generally unable to memorize their account numbers. As a result, it is customary for a financial institution to issue a financial instrument that displays the account number or contains this information on a readable medium, such as a magnetic strip. Therefore, financial transactions are traditionally conducted through financial instruments.

If the financial instrument information of a consumer is stolen, however, a fraudster can use the stolen information to fabricate a counterfeit financial instrument or provide fraudulent instructions to steal funds. Therefore, protecting a customer's financial instruments has been essential to preventing financial transactions fraud.

Many methods have been disclosed to protect financial payment cards. For example, some methods suggest providing consumers with temporary card numbers that automatically expire when certain criteria is met. Some methods suggest that cardholders should deactivate their card accounts while they are not using the cards and activate their card accounts again before they use their cards. In general, these methods create significant expenses for financial institutions and consumers, and often create more confusion than protection for the consumers.

Furthermore, each temporary card number issued by a financial institution must be able to uniquely identify the cardholder. Unfortunately, ensuring that the temporary card number is unique is a difficult task. For example, if the financial institution uses a "card number generator" for producing a temporary card number that will only repeat itself after the generator has produced many additional temporary card numbers, the information and algorithm of this "card number generator" can be stolen by fraudsters. A fraudster can duplicate a "counterfeit card number generator" and synchronously produce "counterfeit temporary card numbers" that are identical to the temporary card numbers produced by the real card number generator. Consequently, these "counterfeit temporary card numbers" can also be used to fraudulently purchase goods and services.

To avoid the potential problem of identical counterfeit temporary card numbers, a financial institution can use a "random number generator" to randomly produce new temporary card numbers. To ensure that a new randomly-generated card number is truly unique; however, the financial institution compares the new temporary card number with all previously produced temporary card numbers. If a new temporary card number is not unique, the financial institution randomly generates another new temporary card number and compares the new temporary card number with all active, old temporary card numbers to avoid duplication. When many existing numbers have already been generated, this process repeats until a truly unique, new temporary card number is randomly generated. This process is not practical because too much time and computer processing power is involved in producing a unique, randomly generated temporary card number.

Moreover, to be unique, a temporary card number should contain enough digits so that it will not easily repeat itself. A typical consumer cannot remember a long number. As a result, the long card number is generally written down on a piece of paper, which can also be stolen by a fraudster.

Alternatively, a long temporary card number can be sent to the mobile phone or computer of the consumer to avoid the consumer's memorization of the temporary card number. Manual entry of a long temporary card number provided by the consumer into the merchant's point-of-sale terminal, however, becomes a painful and inconvenient payment process to both the merchant and the consumer.

If a merchant is going to scan a bar code displayed on the mobile phone of the consumer, which represents a temporary card number, the merchant needs to change its point-of-sale terminal hardware and software to accommodate the new payment method. Changing the point-of-sale hardware and software costs money and time, thus merchants are less willing to adopt such a payment method. Also, a temporary card number sent to the mobile phone of the consumer can be stolen by a fraudster during the data transmission. As seen by the aforementioned examples, an ideal anti-fraud payment solution is unavailable.

One aspect of the present disclosure reduces or eliminates dependence on traditional financial instruments while strengthening the level of financial security for all parties involved in financial transactions.

In one aspect of the present disclosure, a computer system conducts financial transactions without using traditional financial instruments. The computer system may include a processor and a memory device coupled to a network, and a database stored on the memory device. In one configuration, the computer system stores contact information of a user's personal communication device associated with the user's account. A personal communication device may include a cellular phone, a mobile phone, a smartphone, a smartbook, a PDA, a personal computer, and other like portable devices with communication capability for personal use.

Using a personal communication device, the geolocation data of the personal communication device is sent to the computer system. The computer system identifies the user account that is associated with the personal communication device from which the geolocation data was sent, and randomly generates a short passcode, (e.g., 4 digits long), with a fixed lifetime. The computer system uses a communication module to send the passcode to the user's personal communication device in response to receiving the geolocation data. The computer system associates the geolocation data of the user's personal communication device and the passcode with the user's account. The computer system also stores this information in a database.

When this passcode is received from a subject (e.g., a merchant), the computer system compares the geolocation data associated with the passcode to the geolocation data of the subject. If the comparison of both sets of geolocation data satisfies a pre-determined condition of proximity and the passcode has not yet expired, the computer system uses a transaction processing module to permit the subject to conduct a transaction with the user's account.

When more than one passcode is found in the database that satisfies the pre-determined condition of proximity, the user provides additional personal information or personal knowledge so the computer system can identify the correct user account with which to conduct the transaction. For example, this additional information can be the last four digits of the user's personal communication device address or number, the first two letters of the user's last name, the zip code of the user's mailing address, or other like additional information.

In another aspect of the present disclosure, a user selects a store on his/her mobile device, and the store selection data is sent back to the computer system. The computer system identifies the user account that is associated with the personal communication device from which the store selection data was sent, and randomly generates a short passcode, (e.g., 4 digits long), with a fixed lifetime. The computer system uses a communication module to send the passcode to the user's personal communication device in response to receiving the store selection data. The computer system associates the store selection data and the passcode with the user's account; this information is stored in a database. When a passcode is received from the selected store and the passcode has not yet expired, the computer system uses a transaction-processing module to permit the store to conduct a transaction with the user's account.

Because a typical store seldom has more than, for example, 9,999 persons purchasing goods and services at the same time, the chance of a duplicate passcode can be eliminated by reducing the lifetime of the passcode. If there is a duplicate passcode found in the database for the same store, then the user provides additional personal information or personal knowledge so the computer system can identify the correct user account with which to conduct the transaction, for example, as described above. Furthermore, a password can be requested from the user to further strengthen the security of this payment method.

In this disclosure, a geolocation identifies the real-world geographic location of an object. There are several different formats for presenting a geolocation. Regardless of which format is used, the location of an object can be obtained from its geolocation data after a proper translation. In addition, the distance between two geolocations can be obtained through calculations. As described herein, the terms "location information" and "geolocation information" are used interchangeably in the present disclosure. Furthermore, the phrases "distance between two geolocations" and "distance between two locations" are used interchangeably in the present disclosure.

In this disclosure, the terminology "network" or "networks" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to reach the purposes of the system.

In this disclosure, the terminology "processor" generally refers to either one processor or a group of processors, which may work alone or work together to accomplish the purposes of the computer system.

In this disclosure, a "bank" or "financial institution" generally refers to a financial service provider, either a bank or a non-bank, where financial services or money services are provided.

In this disclosure, a "bank account" or "financial account" generally refers to an account associated with an organization, either a bank or a non-bank, where financial transactions can be conducted through financial instruments such as cash, checks, credit cards, debit cards, ATM cards, stored value cards, gift cards, pre-paid cards, wires, coupon, token, ticket, voucher, monetary instruments, letters of credit, notes, securities, commercial papers, commodities, precious metal, electronic fund transfers, automatic clearing house, etc.

In this disclosure, "financial transactions" generally refer to transactions related to financial activities, including but not limited to payment, fund transfer, money services, payroll, invoicing, trading, escrow, insurance, underwriting, merger, acquisition, account opening, account closing, etc.

In this disclosure, a "consumer" generally refers to a customer, person, subject, subject person, payer, user, or client, etc., seeking to perform a transaction with an individual, an organization, a merchant, and/or a financial institution.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical appearance descriptions, and other biometrical information.

In this disclosure, "personal information" includes at least personal identification information, personal relationships, personal status, personal background, personal interests, personal knowledge, and personal financial information including information related to financial instruments, financial accounts, and financial activities.

In this disclosure, "financial instruments" generally refer to instruments, which are used to conduct financial transactions. Examples of financial instruments include cash, credit cards, debit cards, ATM cards, prepaid cards, stored value cards, gift cards, checks, monetary instruments, wire transfers, coupons, tokens, tickets, vouchers, letters of credit, notes, securities, commercial papers, commodities, gold, silver, and other like tender.

In this disclosure, a "personal communication device" generally refers to a device interface used for personal communication purposes.

In this disclosure, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a Smartbook interface, other communication device interface, a Personal Digital Assistant (PDA) interface, a handheld device interface, a portable device interface, a wireless interface, a wired interface, and other interfaces.

In this document, the terminology "terminal" or "kiosk" generally refers to equipment, including a computer and/or its peripherals, microprocessor and/or its peripherals, ATM terminal, check cashing kiosk, money services kiosk, merchant checkout stand, cash register, coin exchange machine, parking lot payment kiosk, other payment kiosks, contactless device, wire line phone, mobile phone, smartphone, Smartbook, personal communication device, PDA, digital assistant, entertainment device, network interface device, router, and/or Personal Digital Assistant (PDA), etc., which interfaces a user with a computer network, so that the user may interact with computer systems and other equipment connected to the computer network.

Reference should also be made to our co-pending U.S. patent application Ser. No. 13/595,768, filed on Aug. 27, 2012, in the names of Song, et al., entitled "Transactional Monitoring System," the disclosure of which is expressly incorporated by reference in its entirety.

This has outlined, rather broadly, the features and technical advantages of the present disclosure in order that the detailed description that follows may be better understood. Additional features and advantages of the disclosure are described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE FIGURES

The features, nature, and advantages of the present disclosure will become more apparent from the detailed description set forth below when taken in conjunction with the drawings.

DETAILED DESCRIPTION

Figure 1:
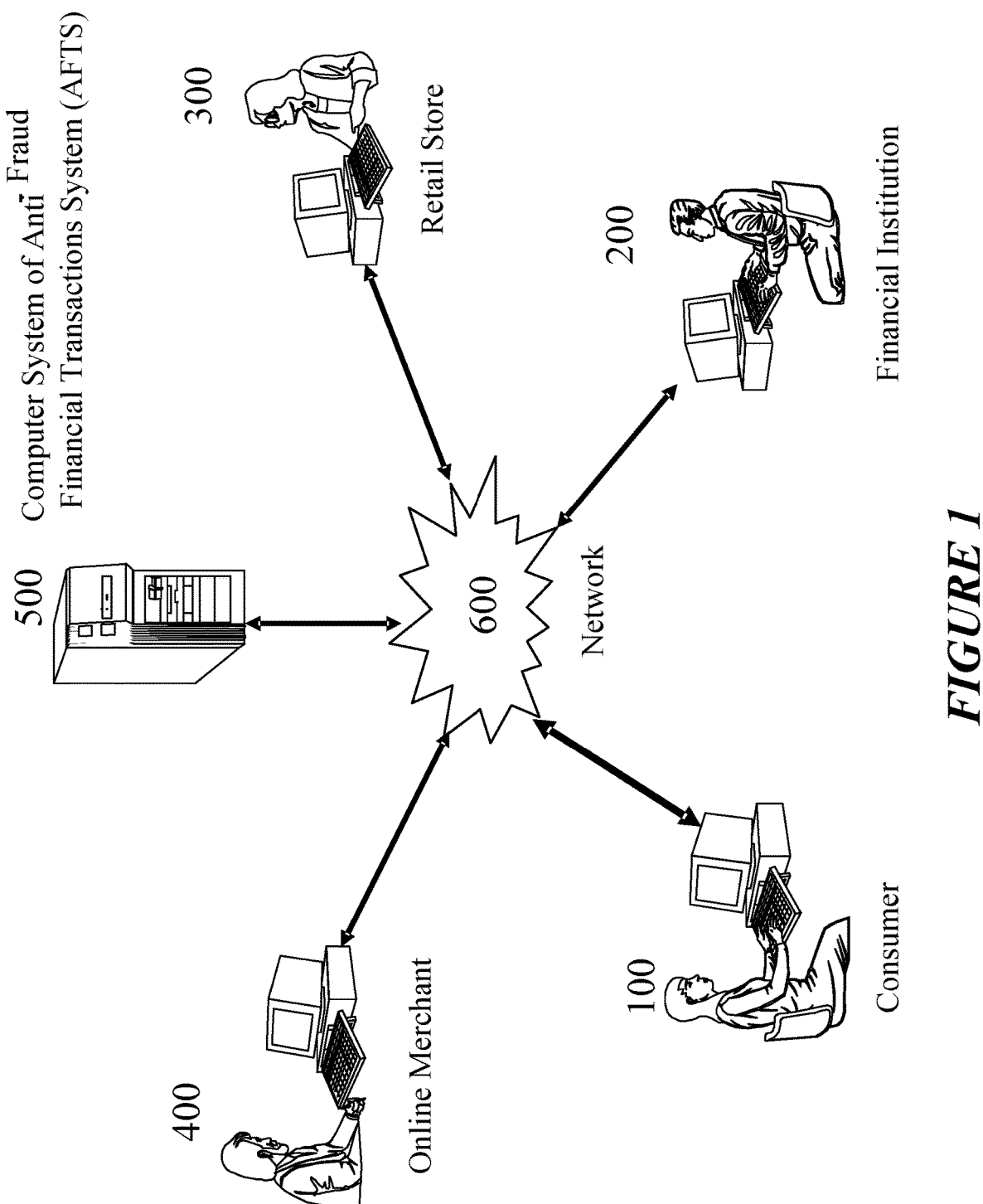
FIG. 1 illustrates a system and network diagram of an Anti-Fraud Financial Transactions System ("AFTS") to enable consumers, financial institutions, and merchants to conduct secured financial transactions according to one aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR," and the use of the term "or" is intended to represent an "exclusive OR."

There are about seven billion people on earth and each one must potentially be uniquely identified to avoid confusion in financial transactions. In addition, each financial institution that owns financial accounts must be uniquely identified. That is why a credit card number or a debit card number usually has a length of about 15 to 20 digits.

Traditionally, a financial account is identified by an account number. For many people, it is difficult to remember an account number of 15 digits to 20 digits, or a data string of equivalent length. Therefore, a consumer usually carries a financial instrument that contains the account number or the account identification information.

Because financial instruments can be easily stolen or fabricated, one aspect of the present disclosure eliminates the use of traditional financial instruments. Nevertheless, traditional financial instruments also provide an important function of linking a consumer to his/her account in a financial institution. Therefore, this linking function is replaced with an alternative method, according to one aspect of the disclosure, that eliminates traditional financial instruments.

One aspect of the present disclosure includes an Anti-Fraud Financial Transactions System (AFTS) based on a computer system. The AFTS computer system may include device interfaces, a central computer system having memory, a database, and peripherals connecting consumers, individuals, organizations, merchants, financial institutions, and the like through the device interfaces. In this configuration, the AFTS computer system (referred to as the computer system of AFTS, or the AFTS computer system hereinafter) is used to manage the individuals, consumers, organizations, merchants, financial institutions, accounts, financial activities, etc. on the computer network in a secure manner.

In one aspect of the present disclosure, once a consumer uploads his/her name and tax ID to open an account, the AFTS computer system verifies the existence of the consumer through government records. Once the existence of the consumer is recognized, the account is opened for the consumer. Because each consumer has a unique tax ID in a country, each consumer has only one chance to open an account with the computer of the AFTS. If a duplicate tax ID is detected, the AFTS computer system can conduct an investigation to identify the consumer with the correct tax ID and filter out the fraudster. The tax ID can be encrypted in the database of the AFTS computer system, or encrypted in a separate database, so that the tax ID is secured after the account opening process.

Most countries have imposed anti-money laundering and anti-terrorist financing obligations upon financial institutions. These financing obligations specify financial institutions to, for example, (1) verify and record the sender's (payer's) and recipient's (payees') identification information, (2) check the sender (payer) and recipient (payee) against the "blacklists" published by various governments before completing the transaction, and (3) detect any suspicious activity through transactional monitoring and report it to the government agencies.

The scope of transactional monitoring, as specified by law, is actually very broad. For example, if a financial institution recognizes that several different customers are sending money to the same recipient and the aggregate amount is very large, the financial institution has an obligation to study the recipient and determines whether the customers and the recipient are financing terrorist activities. If the financial institution identifies any suspicious activity, the financial institution must report the case to a government agency.

If the financial institution recognizes that a consumer is paying a recipient, with a name that is similar to a name on a blacklist published by the government, the financial institution cannot complete the transaction until it has proven that the recipient is not on the blacklist.

Although specified by law, transactional monitoring is not possible in many of today's transactions (e.g., online) because the financial institution often cannot verify an identity of the payers and payees. Consequently, financial institutions cannot really fulfill their legal obligation of enforcing anti-money laundering and anti-terrorist financing measures in these transactions.

To comply with anti-money laundering and anti-terrorist financing requirements, in one aspect of the present disclosure, the computer system may screens all members (i.e., the consumers, merchants, financial institutions, etc.) against the regulatory lists to ensure that the AFTS computer system can conduct transactions with these parties in compliance with applicable regulations and laws. The computer system of AFTS may conduct transactional monitoring to detect suspicious activities in compliance with applicable regulations and laws.

In yet another aspect of the present disclosure, a consumer provides information about a financial account under the consumer's name. The financial account information can be encrypted so that the account information remains secure. The AFTS computer system can conduct a transaction with the consumer's financial account and request the consumer to report the amount and/or the type of transaction. If the consumer cannot correctly report the requested information, the consumer may be a fraudster because he/she cannot tell what is going on in his/her own financial account.

To ensure that the personal identification information stored in an AFTS database is up-to-date, in one aspect of the present disclosure, a consumer updates his/her personal identification information in the AFTS database whenever there is a change of information. For example, when a consumer moves to another state, his/her driver's license and address may be changed, and the consumer may update the personal identification information stored inside the AFTS database.

In one aspect of the present disclosure, based on geolocation data of a personal communication device of a consumer provided to the AFTS computer system, the AFTS computer system can detect a possible address change if the locations of a consumer's transactions have substantially changed to a new area. Upon the detection of a possible address change, the AFTS computer system can send a message to the consumer and request the consumer to update his/her personal identification information. In this configuration, the AFTS computer system uses a consumer provided contact phone number and/or email address for contact purposes.

In one aspect of the present disclosure, a consumer inputs a list of questions and answers into the AFTS database. The list of questions and answers may be designed by the consumer and may relate to unique information known only by the consumer. For example, a question may be "What is the name of my favorite teacher?" The answer to this question should be similarly unique. Because the questions are designed by the consumer, the chance for a fraudster to know the answers is unlikely. As described herein, these questions are referred to as "challenge questions."

In another aspect of the present disclosure, the challenge question may be "What is the key code?" In response, a consumer is instructed to input a key code into the device interface of the AFTS computer system. The key code may be an alphanumeric combination designed by the consumer, substantially like a password. The chance of another person knowing or correctly guessing the key code is low.

To further strengthen the consumer protection, in yet another aspect of the present disclosure, the AFTS uses each key code only once during a pre-defined time period. The consumer may update the key code periodically. Alternatively, the consumer can store multiple key codes at one time to avoid the burden of having to frequently update the key codes.

In one aspect of the present disclosure, the consumer uploads his/her recent photo into the AFTS computer system. Because a person's face is exposed to the public every day and many online social networks may have already posted a photo of the person on the Internet, the photo of a consumer is generally not considered "private information." This photo can be used to enhance the security of the AFTS computer system.

Once an account is opened, an account of a consumer can be identified by a set of alphanumerical data ("Account Avatar"), which is selected from a portion of the personal information of the consumer, but cannot be used to recover the personal information of the consumer. For example, a consumer can be identified by a combination of the zip code of the address shown on the consumer's identification document, the year of birth, the last four digits of the ID number, the first two letters of the first name, the first two letters of the last name shown on the ID, the country/state of issuance of the ID, the expiration date of the ID, or other portions of like personal information. Because only a few letters and numbers of the consumer's personal information are used, the true identity of the consumer is not disclosed. Furthermore, there is no way to recover the personal information of the consumer from or through these pieces of data.

Although only a few letters and numbers of the consumer's personal information are used, the probability of a mismatch when two persons have the same set of partial data can be substantially reduced to zero if a sufficient amount of partial data is used. In the current example, the probability of a mismatch is in the magnitude of about 1 out of $10^{22}$. The number $10^{22}$ is derived from the approximation of $10^5$ (5 digit zip code)$\times 10^2$ (year of birth based on two digits of a 100-year life span)$\times 10^4$ (4 digits of ID number)$\times 26^2$ (2 letters of first name)$\times 26^2$ (2 letters of last name)$\times 200$ (estimated number of participating countries)$\times 365 \times 4$ (a 4-year effective period for the ID). As a result, a payer's account can be securely identified by the payer's account avatar. A payee's account can also be identified by the payee's account avatar.

Even in the extremely unlikely event that two consumers have the same set of partial data, such confusion can be easily resolved by other methods. For example, the AFTS computer system can assign an additional alphanumerical data string with a very short length (e.g., six digits) to distinguish among persons that have the same set of partial personal identification information.

Because there are about 7 billion persons on earth (i.e., $7 \times 10^9$), the total number of persons who may have the same set of partial personal data is a very small number if a sufficient amount of partial personal data is used to distinguish them. As a result, a few digits and/or letters are more than sufficient to identify the entire population on Earth when a set of partial personal data is also used for identification purposes. In fact, it is possible that even 2 or 3 digits are sufficient.

Because only a few letters or digits are assigned by the AFTS computer system, a consumer can remember this short data string of a few digits and/or letters because the consumer should know his/her own personal information.

As described herein, this short data string is referred to as account identification number (AIN). In one aspect of the present disclosure, an Account Avatar of the AFTS computer system, which replaces the effect of a traditional account number, is expanded to include both the AIN and a set of personal data. For example, a possible Account Avatar of the AFTS computer system can be composed of the 5-digit zip code of the consumer, the last 4 digits of the consumer's phone number, and a 6-digit MN. In general, a consumer remembers his/her zip code and phone number. As a result, a consumer only remembers his/her short AIN when using an Account Avatar.

In one aspect of the present disclosure, the AIN is assigned by the AFTS computer system. To further reduce consumer memorization of numbers, in another aspect of the present disclosure, a consumer can suggest his/her own preferred AIN. The AFTS computer system approves the particular AIN if no other person in the AFTS database, whose set of partial personal data is identical to the consumer's, has used the suggested AIN.

If a zip code is not used in a particular country or area, a possible account number of the AFTS computer system can be composed of, for example, the last 5 digits of the official identification document number of the consumer, the last 4 digits of the consumer's primary phone number, and a 6-digit AIN assigned by the AFTS computer system. In fact, many other different pieces of partial personal information can be used to achieve the same goal of identifying an account. Although we use digits in the above example, an AIN can be an alphanumerical number, a data string or other like information.

Because only partial personal information is used, the identity of the consumer cannot be recovered from an Account Avatar. Consequently, the privacy of the consumer is fully protected.

In an alternative aspect of the present disclosure, if privacy is not a concern, the personal phone number of a person and the country code and the area code of the person can uniquely identify the person.

The above approach of using an Account Avatar to identify an account can also be used by an automatic checkout stand, an ATM terminal, a kiosk, or other types of device interfaces.

In the event that a consumer cannot remember this short AIN of a few digits and/or letters, in one aspect of the present disclosure, a consumer can use his/her identification document to conduct financial transactions. The information on the identification document can be entered by the consumer, the merchant, or the financial institution. "Official" identification documents are effective for fraud prevention because official identification documents are protected by the respective government organizations that issued the respective official identification document.

In another aspect of the present disclosure, a device interface, such as a terminal, reads the information embedded within or on the identification document. As a result, a consumer can pay for goods or services with his/her identification document at an automatic checkout stand.

Another aspect of the present disclosure eliminates resending of all the information of the identification document to the AFTS computer system. To protect the consumer's personal information, which can be stolen during the data transmission, letters and numbers of the personal information can be used for identification purposes. For example, the 5-digit zip code, the last 6 digits of the identification document number, and the initial of the last name can be used for identification purposes. In this example, the chance of a mismatch is one out of 2.6 trillion (i.e., $26 \times 10^5 \times 10^6$).

In another aspect of the present disclosure, a personal identification number (PIN) is used for the dual purposes of (1) eliminating the chance of mismatch and (2) enhancing security. In one configuration, the PIN is assigned by the AFTS computer system. In another configuration, the PIN is suggested by the consumer and becomes effective after the approval by the AFTS computer system.

In yet another configuration, a PIN is composed of some digits suggested by the consumer and some digits assigned by the AFTS computer system. In an alternative configuration, an AIN or a part of the AIN is used as the PIN. In yet another alternative configuration, a PIN or a part of the PIN is used as the AIN.

If privacy is not a concern, in one aspect of the present disclosure, the entire identification document number is used for account identification purposes to reduce the probability of mismatches. Because there are many different countries, states and governments that issue identification documents (e.g., driver licenses, passports, etc.), an identification document number may not be unique. Under such circumstances, a PIN and/or AIN can eliminate the confusion. In another aspect of the present disclosure, the identification document number, the zip code, the PIN and/or AIN are jointly used to perform the account identification. The above approach of using an Account Avatar to identify an account can also be used by an automatic checkout stand, an ATM terminal, a kiosk, or other types of device interfaces.

After the consumer has opened an account with the AFTS computer system, if a fraudster tries to use the consumer's stolen identity to conduct a financial transaction at a bank, in one aspect of the present disclosure, a teller can enter into the AFTS computer system an Account Avatar of the consumer. The AFTS computer system can search its database to find and display the photo of the consumer.

If the teller cannot distinguish the fraudster based on the photo of the consumer, in another aspect of the present disclosure, the teller can ask a challenge question or request a key code designed by the consumer. If the person cannot answer the challenge question or give the key code correctly, this person is possibly a fraudster.

In another aspect of the present disclosure, the teller can request the person to provide an additional piece of partial personal information. The AFTS computer system can compare the additional piece of information of the person with the consumer's information stored in the AFTS database to determine whether the person is the consumer.

In yet another aspect of the present disclosure, authorized personnel of a financial institution can call the consumer's phone number, which was provided by the consumer and stored in the AFTS database, to verify whether the consumer is the same person conducting the transactions at the financial institution. In an alternative aspect of the present disclosure, authorized personnel of a financial institution can send an email to the consumer to verify whether the consumer has requested the financial institution to conduct a particular transaction.

In one aspect of the present disclosure, the teller can inform the AFTS computer system if the teller rejects the transaction. In response, the AFTS computer system can send an alert message to the consumer so that the consumer is alerted of possible fraud against the consumer. Similarly, if a fraudster tries to use the consumer's identity to purchase goods or services at a merchant after stealing the consumer's identity, in other aspects of the present disclosure, the photo of the consumer, the challenge questions, the key codes, and/or the additional partial information are used to detect the fraudster.

In another aspect of the present disclosure, the merchant informs the AFTS computer system if the merchant rejects the transaction. In response, the AFTS computer system can send a message to the consumer so that the consumer is alerted that fraud is possibly being committed against the consumer.

If a fraudster tries to use the consumer's identity to purchase goods or services online, in another aspect of the present disclosure, the challenge questions, the key codes and/or the additional partial personal information can be used by merchants to detect the fraudster.

In yet another aspect of the present disclosure, if the AFTS computer system rejects the online transaction because an answer to a challenge question is wrong, the AFTS computer system can also send an alert message to the consumer so that the consumer is alerted of possible fraud being committed against the consumer.

In one aspect of the present disclosure, the AFTS computer system alerts a consumer's financial institution after identifying possible identity theft and/or fraud being committed against the consumer so that the financial institution can act to protect the consumer and the financial institution.

In another aspect of the present disclosure, the AFTS computer system uses the alert provided by the AFTS computer system to implement additional steps to protect the consumer, the financial institution, and possibly other clients of the financial institution. The alerts produced by the AFTS computer may be considered as risk factors associated with financial crimes. An additional software system can be established in the financial institution to prevent financial crimes based on the disclosure of the co-pending application entitled "Transactional Monitoring System," the disclosure of which is expressly incorporated by reference in its entirety. As a result, in one configuration the AFTS computer system enables consumers, financial institutions, and merchants to jointly detect and prevent fraud in financial transactions.

To further automate the financial crime prevention process, in one aspect of the present disclosure, the transactional networks of the financial institutions (e.g., credit card network, debit card network, trading network, insurance network, etc.) are linked to the AFTS computer system. Linking to the AFTS computer system, in this configuration, enables the use of a consumer's photo, challenge questions, key codes, and/or additional information by consumers, merchants or financial institutions when they conduct transactions through these transactional networks.

In another aspect of the present disclosure, the AFTS computer system is integrated into existing networks for credit cards, debit cards, stored value cards, ATM cards, gift cards, prepaid cards, ACH, bank accounts, wire transfers, and the like.

Because each user of the AFTS registers with the AFTS computer system and uses the AFTS services based on a unique identity, the AFTS can conduct financial transactions for the user. There are many ways to transfer funds electronically between an entity's (e.g., payer's or payee's) account in a financial institution and the entity's account in the AFTS computer system. For example, an Automatic Clearing House ("ACH") transaction can be used to complete an electronic fund transfer at a very low cost today.

In another aspect of the present disclosure, debit card networks, credit card networks, ATMs, or other real time and/or non-real time networks are used to transfer funds electronically between an entity's account in a financial institution and the entity's account in the AFTS computer system. Alternatively, an AFTS account can be financed by other like financial instruments and credits issued by the AFTS computer system.

Many financial institutions issue their own financial instruments. These financial instruments, however, may not be universally accepted by all consumers, organizations, or merchants worldwide. For example, the Bank of China issues its own credit cards carrying its own brand name in China. These credit cards are generally accepted in China, but not in many other countries, such as the USA. Therefore, the credit cards issued by the Bank of China cannot be used when the cardholders travel in the USA. This situation applies to many financial instruments issued by many organizations in many countries.

Even in the same region, different consumers, organizations, merchants, etc. may accept different financial instruments. Because many different networks, (e.g., Visa, Master Cad, Amex, etc.) are used in the financial industry and each network has its own terms and conditions, most consumers, organizations, merchants, and the like only use a limited number of financial instruments and do not accept others. For example, some stores only accept Visa cards but not American Express cards. As a result, a black cardholder of American Express (the highest status of American Express clients) may not be able to pay his bill after eating a lunch because the restaurant does not accept American Express cards.

The AFTS computer system connects to all these different financial networks and permits its users to transfer funds between their AFTS accounts and their financial accounts residing on different networks. Because all transactions conducted by the AFTS computer system are based on the AFTS accounts, payees of the AFTS computer system will automatically accept all financial instruments used by payers. For example, if a payer uses an American Express card to finance his AFTS account, a payee receives funds through its AFTS account without knowing where the AFTS computer system obtains funds from the payer.

In one aspect of the present disclosure, the AFTS computer system uses AFTS accounts to conduct financial transactions while the funding sources of a payer's AFTS account is transparent to the payee. As a result, a payer can travel worldwide without worrying about whether his financial instruments are accepted worldwide. A payee can conduct business with all payers without worrying about whether the payers' financial instruments are acceptable. Furthermore, the payer's identity and the payee's identity can be fully protected by the AFTS computer system. As a result, any consumer, individual, organization, merchant, financial institution, etc. can perform worldwide transfer of funds to another consumer, individual, organization, merchant, financial institution, etc. through the AFTS computer system. The AFTS computer system, in one configuration, provides a worldwide common platform for conducting all types of commercial activities.

In one aspect of the present disclosure, a consumer logs into the AFTS computer system through a device interface and opens an account. The consumer provides the AFTS computer system with the consumer's personal information, including personal identification information, personal communication device identification information (e.g., email address, phone number, etc.), personal financial information, etc.

The AFTS computer system processes the personal information submitted by the consumer and approves the opening of an account for the consumer in compliance with regulations and laws. Once an account is opened, a consumer can be identified by his Account Avatar, the identification information of the consumer's personal communication device (e.g., email address, phone number, etc.), in addition to the account number of the consumer.

Identification information of a personal communication device includes a phone number, an email address, an IP address, a caller ID, a SIM card number, an electronic serial number, a mobile identification number and other types of information that are used to uniquely identify a personal communication device. For example, a phone number, which can be used to send and receive messages, may be used as the "identification information" or "contact information" of a personal communication device. Nevertheless, other types of identification information or contact information can also be used for similar purposes.

In one aspect of the present disclosure, when a consumer intends to conduct a payment transaction with a merchant and initiates an application on his personal communication device, the personal communication device of the consumer sends the following information to the AFTS computer system: (1) the geolocation information of the personal communication device and (2) the identification information of the personal communication device, such as a caller ID (i.e., phone number). Based on the identification information of the personal communication device of the consumer, the AFTS computer system can identify the consumer's AFTS account because the identification information of a personal communication device is generally unique worldwide.

In one aspect of the present disclosure, the AFTS computer system randomly generates a passcode, (e.g., a short number of only 4 digits) that is much shorter than an account number, and sends the passcode to the personal communication device of the consumer. The AFTS computer system also records (1) the passcode, and (2) the geolocation information of the personal communication device of the consumer at that time, and associates such information with the AFTS account of the consumer. When the consumer purchases goods or services, in one aspect of the present disclosure, the consumer provides a passcode to the merchant. Because this passcode is very short and can be easily communicated verbally between the consumer and the merchant without confusion, it is not necessary to use scanner to scan the passcode.

In one aspect of the present disclosure, the merchant enters the passcode, which is provided by the consumer, into a device interface of the AFTS computer system. The AFTS computer system uses this passcode to identify all the consumers that have received this passcode and previously sent their geolocations to the AFTS computer system from their respective personal communication devices. If the geolocation of the merchant is within a pre-defined distance of the geolocation of a particular consumer (e.g., within 2 miles), the computer system of AFTS approves the transaction between the merchant and this particular consumer.

If the geolocation of the merchant is not within a pre-defined distance of the geolocation of any consumer (e.g., greater than 2 miles), the AFTS computer system rejects the transaction. This transaction is rejected because it may have been attempted by a fraudster. For a point-of-sale transaction, the consumer should be close to the merchant. A pre-defined distance of two miles is used in this example because shopping centers are usually smaller than a circle with a two-mile radius. Sometimes, the communication signals may be weak inside a shopping center. It is likely that a consumer may receive the passcode at one location where the communication signals are strong, but complete the transaction at another location where the signals are weak. Nevertheless, it is unlikely that a consumer will walk over two miles to complete a transaction after requesting a passcode from the AFTS computer system.

In one aspect of the present disclosure, the AFTS computer system sends a message to the consumer, informing the consumer of the rejection. The AFTS computer system may also inform the merchant of the rejection. Therefore, if a fraudster steals a passcode, the passcode is unusable unless the fraudster is within a short distance of the merchant.

In one aspect of the present disclosure, a personal communication device of a consumer provides a list of stores that are near the consumer based on, for example, the geolocation of the consumer's personal communication device. The consumer selects a store when the consumer intends to conduct a payment transaction with the store. The personal communication device of the consumer sends the following information to the AFTS computer system: (1) the store selected by the consumer and (2) the identification information of the personal communication device, such as a caller ID (i.e., phone number). Based on the identification information of the personal communication device of the consumer, the AFTS computer system can identify the consumer's AFTS account.

In one aspect of the present disclosure, the AFTS computer system randomly generates a passcode and sends the passcode to the personal communication device of the consumer. The AFTS computer system stores into a database (1) the passcode, (2) the consumer's AFTS account, and (3) the AFTS account of the store selected by the consumer. When the consumer intends to purchase goods or services, in this configuration, the consumer provides the passcode to the store. Because this passcode is very short and easily verbally communicated between the consumer and the store, it is unnecessary to scan the passcode.

In one aspect of the present disclosure, the store enters the passcode, which is provided by the consumer, into a device interface of the AFTS computer system. The AFTS computer system uses this passcode and the store's AFTS account to identify the consumer's AFTS account. If (1) the store's AFTS account information, (2) the passcode, and (3) the consumer's AFTS account information are consistent with the records stored in the database, the AFTS computer system approves the transaction. Otherwise, the AFTS computer system rejects the transaction.

In one aspect of the present disclosure, the AFTS computer system sends a message to the consumer, informing the consumer of the approval of the transaction by the AFTS computer system. In another aspect of the present disclosure, the transactional details (e.g., dollar figure, time, location, account balance, etc.) are also sent to the consumer. In another aspect of the present disclosure, as an extra protection, the consumer also needs to approve the transaction after receiving the transactional details for the transaction to be completed. The consumer may enter a key code or personal identification number (PIN) to approve and complete the transaction. In one aspect of the present disclosure, the AFTS computer system informs the merchant of the completion of the transaction. In addition, the transactional details (e.g., dollar figure, time, location, account balance, etc.) may be sent to the merchant.

In one aspect of the present disclosure, to further protect the passcode, the communications between the AFTS computer system and the personal communication device of the consumer are encrypted so that a fraudster cannot steal a passcode during data transmission. In another aspect of the present disclosure, a password is used to protect the personal communication device so that a fraudster cannot obtain the passcode even if the fraudster steals the personal communication device from the consumer.

Because fraud may be involved when the AFTS computer system rejects a transaction, in one aspect of the present disclosure, the AFTS computer system initiates a case for further investigation by fraud investigators of the AFTS. An alert can also be sent to financial institutions of consumers to further prevent financial crimes.

Because the passcode is randomly generated by the AFTS computer system, there is a possibility that an identical passcode is sent to both the consumer and another person that also intends to conduct a transaction with the same store. Under such circumstances, when the consumer wants to purchase goods or services, the AFTS computer system finds that two AFTS account holders have received the same passcode and may conduct transactions with the same store. As described herein, we will refer to this situation as a "duplicate passcode."

In one aspect of the present disclosure, identifying the person that is standing in front of the checkout stand is performed as follows. First, the device interface of the AFTS computer prompts the merchant to ask the consumer to provide an additional piece of information about the consumer and the additional piece of information is entered by either the merchant or the consumer into a device interface of the AFTS computer system. For example, this additional piece of information can be the first 2 letters of the last name of the consumer, the last 4 digits of the consumer's mobile phone number, the zip code of the consumer's mailing address, or other like additional information. Second, the AFTS computer system uses the additional piece of information to identify the consumer's AFTS account. The AFTS computer system approves the transaction conducted between the consumer and the merchant when the consumer's AFTS account is identified.

In an alternative aspect of the present disclosure, the device interface of the AFTS computer system lists at least partial personal identification information (e.g., partial last name, partial phone number, etc.) of both the consumer and the other person when an identical passcode is sent to both the consumer and another person that also intends to conduct a transaction with the same store. In this configuration, the AFTS computer system prompts the merchant to choose the correct person. The merchant can ask questions to the consumer and the other person and choose the correct person accordingly.

In another aspect of the present disclosure, the AFTS computer system can send a new but different passcode to replace the duplicate passcode. As a result of this replacement, the above two persons now have two different passcodes. In yet another aspect of the present disclosure, the AFTS computer system displays photos of both the consumer and the other person and prompts the merchant to choose the correct person. The merchant can then choose the correct person accordingly. In one aspect of the present disclosure, to further reduce the chance that multiple persons have received the same passcode and may conduct transactions with the same store, each passcode is given a pre-determined short lifetime (e.g., 3 minutes). A passcode is disabled after it expires. Because the chance of two persons receiving the same passcode, and purchasing goods and services from the same merchant or two nearby merchants within a short period of time (e.g., 3 minutes) is very low, shortening the lifetime of each passcode is an effective approach to avoid a duplicate passcode. In another aspect of the present disclosure, the pre-defined acceptable "short distance" between the consumer and the merchant is shortened to avoid a duplicate passcode. For example, the chance of two persons receiving the same passcode within 100 feet of a merchant is much less than the chance of two persons receiving the same passcode with 5 miles of the merchant. In an alternative aspect of the present disclosure, the length of the passcode is increased to reduce the chance of a duplicate passcode. In practice, the lifetime of the passcode, the length of the passcode, the random nature of passcode generation, and the acceptable short distance between the consumer and the merchant can be established based on a risk policy of the AFTS computer system.

The above approach of using geolocation information and the identification information of a personal communication device to identify an account can also be used by an automatic checkout stand, an ATM terminal, a kiosk, or other types of device interfaces. In one aspect of the present disclosure, a consumer enters the passcode into an automatic checkout stand or other types of device interfaces. In another aspect of the present disclosure, a device interface, such as a terminal, can directly read a passcode from the consumer's personal communication device. As a result, a consumer can pay for goods or services with his/her passcode at an automatic checkout stand or other types of device interfaces. In an alternative aspect of the present disclosure, the passcode is transformed into a graphical pattern (e.g., a one-dimensional or two-dimensional bar code) and displayed on the personal communication device for easy scanning by optical devices. The passcode can also be transformed into acoustic, electronic, optical, electro-magnetic or magnetic signals (collectively referred to as a "communication signal") so that the passcode is easily read by a device interface. As a result, a consumer can pay for goods or services with his/her passcode almost everywhere.

For illustration purposes, payment transactions are often used as examples in the present disclosure. The present disclosure, however, can be applied to other types of financial transactions in addition to payment transactions.

To facilitate anti-fraud payment transactions for a consumer, in one aspect of the present disclosure, the AFTS computer system receives geolocation information from a payer's personal communication device. The AFTS sends a passcode to payer's personal communication device. The payer provides the passcode to a payee. The payee can then enter the passcode into the device interface that accesses the AFTS computer system over network.

Alternatively, the passcode can be transmitted from the payer's personal communication device through a communication signal to the payee's device interface. Also, the payer can simply enter the passcode into the payee's device interface for a point of sale transaction, or enter the passcode into payee's device interface for an online transaction or a transaction at an automatic checkout stand. In addition, the payee and/or payer can enter a dollar amount the payer is supposed to pay. If the geolocation data associated with the passcode and the geolocation of the payee are within a pre-defined acceptable short distance and there is a sufficient amount of money (including credits) in the payer's AFTS account to cover the payment amount, the AFTS computer system transfers the money from the payer's AFTS account to the payee's AFTS account to complete the payment transaction.

In one aspect of the present disclosure, after receiving the passcode and dollar amount from a payee and verifying that a pre-defined acceptable anti-fraud condition is satisfied, the AFTS computer system freezes the amount of money in the payer's AFTS account and sends a message to the payer to confirm that this amount is being debited from the payer's AFTS account. The dollar amount, and/or the payee's name may be sent to the payer through payer's personal communication device or other communication channels.

After reviewing the transactional details and the payee's name, in one aspect of the present disclosure, the payer approves the transaction by sending a message from the payer's personal communication device to the AFTS computer system. The AFTS computer can then transfer the frozen amount of money from the payer's AFTS account to the payee's AFTS account to complete the payment transaction.

In one aspect of the present disclosure, the confirmation sent to the AFTS computer system from the payer's personal communication device also contains a PIN only known by the payer. The confirmation sent by payer should occur within a fixed amount of time. If the confirmation by payer is not received within that fixed amount of time, the transaction can be automatically canceled and the frozen amount of money in the payer's AFTS account is released back to the payer.

In one aspect of the present disclosure, if the dollar amount of a single transaction exceeds a threshold set by the consumer, the consumer's AFTS account is frozen until the consumer resets the account. Alternatively, if the aggregate amount of transactions of a consumer's AFTS account during a pre-defined period of time exceeds a threshold set by the consumer, the consumer's AFTS account can be frozen. This frozen account can be reset by the consumer. Similarly, if the total number of transactions in a consumer's AFTS account during a pre-defined period of time exceeds the threshold set by the consumer, the consumer's AFTS account can be frozen. The consumer can reset or unfreeze the account. The consumer can log into the AFTS computer system to reset the consumer's AFTS account. Alternatively, a counter party (or payee) and/or consumer can enter an authorization code that is only known to the consumer to reset the account.

Because the passcode is newly generated by the AFTS computer system in each transaction, the counter party to the transaction does not know what the passcode is in each transaction and cannot steal money from the consumer. Because the passcode is sent only to the consumer, a third party is prevented from stealing money from the consumer because the third party does not receive the passcode to complete the transaction. Furthermore, the geolocation verification and/or store selection information ensures that the consumer is the correct AFTS account holder. Consequently, the AFTS is useful for various financial transactions, including point-of-sale transactions in which two parties meet face-to-face, as well as online transactions and remote transactions in which the counter parties (or payees) cannot verify the consumer's (or payer's) identity.

In one aspect of the present disclosure, when a payer places an order on the Internet, the payer sends identification information of a merchant to the AFTS computer system and receives a passcode from the AFTS computer system. The passcode information is stored by the AFTS computer system, associated with the merchant's AFTS account and the consumer's AFTS account. The payer can enter the passcode received from the AFTS computer system into the device interface of the Internet merchant. This passcode is resent by the Internet merchant to the AFTS computer system. If the passcode is correct and matches the records of both the merchant's AFTS account and the consumer's AFTS account, the AFTS computer system approves the transaction.

Alternatively, the AFTS computer system sends a message to the payer requesting approval of the transaction. Then, the payer can send a message to the AFTS computer system to approve the transaction. The AFTS computer system receives the approval message from the payer and transfers the payment from the payer's AFTS account to the payee's AFTS account to complete the transaction.

In one aspect of the present disclosure, an additional piece of partial information of the payer (e.g., home zip code of the payer) is used in the transaction to further strengthen the security of the transaction. The geolocation of the payer can be used to further strengthen the security of the transaction. For example, if the geolocation of the payer is near the geolocation of the AFTS account holder's home address, the chance for fraud is reduced.

In an alternative aspect of the present disclosure, after receiving the passcode, a payer sends an electronic message to the AFTS computer system to approve a particular transaction based on the particular passcode associated with the transaction. As a result, the payer can securely complete the online transaction without releasing any personal identification information. Eliminating the release of personal identification information suppresses the possibility of fraud, and protects both the payer and the payee.

In another aspect of the present disclosure, a payer orders goods or services remotely through a phone call. The payer's personal communication device sends the AFTS computer system the identification information of the payee (e.g., a merchant code provided by the merchant (i.e., payee)). In response to receiving this information, the AFTS computer system sends the payer a passcode that the payer then gives to the payee. After the payee enters the payer's passcode into a device interface of the AFTS, the AFTS computer system approves the transaction if the passcode is correct and matches the records of both the merchant's AFTS account and the consumer's AFTS account. A partial data string of the payer's personal information can also be provided to the payee to further enhance the security. For example, if the payer's partial personal information provided to the payee does not match the record inside the AFTS computer system, the AFTS computer system can reject the transaction because of possible fraud.

Alternatively, the AFTS system sends a message to the payer requesting approval of the transaction. The payer sends an approval message to the AFTS computer system to complete the transaction. In one aspect of the present disclosure, an approval specifies that the geolocation of the payer's personal communication device and the home zip code of the payer are within a pre-defined acceptable short distance. As a result of the present disclosure, the payee can complete the transaction without knowing the payer's identity, and both parties are fully protected in the transaction.

In another aspect of the present disclosure, a payer can complete the payment transaction by himself at an automatic checkout stand. The payer's personal communication device sends the payee's identification information to the AFTS computer system from the payer's personal communication device. In response to receiving this information, the AFTS computer system sends the payer a passcode that the payer enters into the automatic checkout stand. The passcode information is stored and associated with the payee's AFTS account and the payer's AFTS account. Alternatively, the passcode can be transmitted by a communication signal from the payer's personal communication device to the checkout stand. The checkout stand sends the passcode to the AFTS computer system. The AFTS computer system approves the transaction if the passcode is correct and matches the records of both the payee's AFTS account and the payer's AFTS account. A PIN or a piece of partial personal information of the payer can also be used to strength the security.

Alternatively, in one aspect of the present disclosure, after receiving the passcode, the AFTS computer system requests the payer to approve the transaction, for example, by sending a message to the payer's personal communication device. The payer can send an approval message to the AFTS computer system to transfer the payment from the payer's AFTS account to the payee's AFTS account to complete the transaction. In an alternative aspect of the present disclosure, after receiving the passcode, the payer sends a message to the AFTS computer system to approve a particular transaction based on the particular passcode associated with that transaction. Both payer and payee are fully protected against fraud in this transaction and the payer's identity is not disclosed. Similarly, the present disclosure can be used at an ATM, kiosk, or other types of device interfaces.

The system of the present disclosure can potentially replace traditional payment instruments and, at the same time, provide improved protection for consumers, individuals, organizations, merchants, financial institutions, etc. Furthermore, consumers are freed from carrying traditional financial instruments. Moreover, the present disclosure can quickly and securely transfer money to any place with access to the AFTS computer system. As a result, the AFTS can become a Global Payment Network. As an additional convenience to the consumer, in one aspect of the present disclosure, a consumer can go shopping without carrying a traditional financial instrument. This option is very useful for protecting young children whose parents do not feel comfortable letting their children carry cash or pre-paid cards for safety reasons.

In fact, a consumer can easily conduct any payment as long as he/she carries a personal communication device. As a result, in the event that a consumer forgets his/her wallet, he/she can still pay the merchant through his/her AFTS account. If the consumer also forgets to carry a personal communication device, he/she can still use the merchant's computer to log into the AFTS computer system to directly transfer funds from the consumer's AFTS account to the merchant's AFTS account.

The financial transactions referred to in the present disclosure are not limited to payment transactions. The same system and method can be used for other types of financial instructions. For example, in one aspect of the present disclosure, a consumer (e.g., a stock trader) can give a stockbroker (i.e., the counter party) a passcode, or send the passcode through a communication signal from the stock trader's personal communication device. The AFTS computer system uses the passcode and the geolocation of the personal communication device of the stock trader to identify the account of the stock trader, verify the identity of the stock trader, and approves a face-to-face transaction.

In another aspect of the present disclosure, if the transaction is conducted online, the AFTS computer system uses the passcode, zip code (or other identification information), and the geolocation of the personal communication device to identify the account of the stock trader, verify the identity of the stock trader, and approve the online transaction. Alternatively, the stock trader can enter the passcode into stockbroker's device interface for a point of sale transaction, or an online transaction. In one aspect of the present disclosure, the transaction details and/or the stockbroker's name are sent to the stock trader through a personal communication device or other communication channels. After reviewing the transactional details and the stockbroker's name, the stock trader can send a message through his personal communication device or other means to the AFTS computer system to complete the transaction. In addition to stock trading transactions, other financial transactions can be conducted in a similar manner through the AFTS computer system.

For example, the present disclosure also replaces traditional paper-based financial instruments by storing them in electronic format associated with the AFTS accounts. As described herein, an electronic financial instrument or other like financial account identification has the same value and effect as the traditional financial instrument, except that it is stored in electronic format. In one aspect of the present disclosure, an electronic financial instrument is electronically transferred from one AFTS account to another AFTS account. The transfer of an electronic financial instrument can be accomplished by changing the electronic record regarding ownership because no physical financial instrument is transferred.

For example, in one aspect of the present disclosure, a consumer gives a counter party (e.g., merchant) the consumer's Account Avatar of his AFTS account and/or the consumer's identification document. Alternatively, a communication signal to identify the consumer's AFTS account can be sent from the consumer's personal communication device. The counter party can then input the Account Avatar and/or the identification document information into a device interface of the AFTS computer system, or receive the communication signal through a device interface of the AFTS computer system. In one aspect of the present disclosure, the AFTS computer system sends a passcode to the personal communication device of the consumer based on the consumer's AFTS Account Avatar and/or the consumer identification information.

As explained earlier, in an alternative aspect of the present disclosure, the geolocation of the personal communication device and the passcode are used to identify the account of the consumer without the consumer providing other account identification information. Alternatively, in one aspect of the present disclosure, a consumer sends the identification information of the counter party to the AFTS computer system through a personal communication device of the consumer. A consumer can request the AFTS computer system to send a passcode to the personal communication device of the consumer. This passcode is associated with both the consumer's AFTS account and the counter party's AFTS account.

In addition, the counter party can conduct a transaction based on an electronic financial instrument. If the consumer's account meets the requirements for this particular transaction (e.g., correct electronic financial instruments are available and/or sufficient funds are available), the AFTS computer system can hold the electronic financial instrument associated with the transaction and issue a new "passcode." Holding the electronic financial instrument associated with the transaction ensures that the electronic financial instrument is available to complete the transaction.

In one aspect of the present disclosure, the transaction details and/or the counter party's identification information are sent to the consumer through a personal communication device or other communication channels.

After receiving the passcode and reviewing the transactional details and the counter party's identity, in one aspect of the present disclosure, the consumer gives the passcode to the counter party if the consumer intends to complete the transaction. Then, the counter party can enter the passcode into the device interface of the AFTS computer system. If the passcode entered by the counter party matches the passcode sent to the consumer, the AFTS computer system completes the transaction between the consumer and the counter party based on the electronic financial instrument. In this example, the transaction is the counter party's acceptance of the electronic financial instrument and/or the amount from the consumer. If the passcode entered by the counter party does not match the passcode sent to the consumer, the AFTS computer system rejects the transaction. Under such circumstances, the AFTS computer system may freeze the consumer's account to protect the consumer.

Alternatively, the consumer can enter the passcode into the counter party's device interface for an in-person transaction (e.g., at a store). Otherwise, the consumer enters the passcode into the counter party's device interface for an online transaction (e.g., shopping on the Internet). In another aspect of the present disclosure, after receiving the passcode, a consumer sends a message to the AFTS computer system to approve the transaction based on the electronic financial instrument. As a result of the present disclosure, a consumer can easily use his/her electronic financial instrument to complete a transaction with a counter party through the AFTS computer system.

Currency, coupons, tokens, tickets, vouchers, certificates, notes, securities, letters of credit, etc. have been used in paper format for many years. These paper-based financial instruments are difficult to manage and can be easily counterfeited. For ease of explanation, we will use coupons, which offer discounts for goods and services, as an example of a paper-based financial instrument.

First, a consumer cuts out coupons from newspapers and magazines, or prints them from promotional emails before shopping at a store. Cutting out or printing coupons one by one involves time and patience. Very often, a consumer may forget to bring the correct coupons to the store. After a transaction is conducted based on a coupon, the store clerk keeps the paper-based coupon for record keeping. For auditing purposes, someone counts these used coupons to verify the accounting records. Therefore, paper-based coupons create a great deal of overhead.

Coupons are published by different entities, such as stores, original manufacturers, head offices of franchises, etc. Sometimes stores falsely claim rebates from the original manufacturers or the head offices of franchises by collecting unused coupons from recycled newspapers or magazines. This type of fraud is sometimes referred to as "coupon fraud."

Furthermore, a paper-based coupon that is purchased in advance is like cash, but can be counterfeited or stolen more easily than cash. Thus, these paper-based coupons also create risk of fraud and robbery. Moreover, a majority of paper-based coupons are buried inside newspapers and magazines, which end up in trashcans. These coupons are never used. As a result, paper-based coupons also waste natural resources and cause environmental damage.

In the present disclosure, the AFTS computer system distributes electronic coupons for original manufacturers, head offices of franchises, stores, and other merchants through a network such as the Internet. A consumer can select the coupons he/she uses through a device interface of the AFTS computer system. The selected coupons are linked to the consumer's AFTS account. If a coupon specifies advance payment, the consumer can pay through his/her AFTS account. Alternatively, to make life easier for consumers, applicable coupons are linked to the stores' AFTS accounts and the consumers do not select the coupons. For example, when the consumer checks out from a merchant, the AFTS system obtains the applicable coupons linked to the merchant's AFTS account and applies them to the transaction.

Distributing coupons for stores and other types of businesses to consumers through the Internet has been implemented by some vendors for a number of years. The traditional approach permits consumers to print coupons from a website on the Internet. The challenge is that many consumers usually do not like to spend time searching the Internet before shopping. After spending 30 minutes to an hour searching the Internet, people may lose interest in shopping. Therefore, permitting consumers to print paper coupons from a website on the Internet is not a popular method.

Most stores depend on traditional approaches of mailing paper coupons to consumers. The cost of such coupon distribution is very high and the environmental damage is significant. Furthermore, a long process is performed before launching a coupon marketing campaign because a store needs time to design the coupons, prints the coupons, package the coupons in envelopes, purchase mailing lists, print mailing labels, and mail the coupon packages. It is possible that a store will miss critical market timing after this long preparation process. The postage of mailing coupons is also very expensive when a large quantity of recipients is involved. A store invests a great deal of money and effort up front with no guarantee of a desired result from a coupon marketing campaign.

Some vendors are in the business of distributing paper coupons for stores. These vendors may insert many coupons from different stores in the same envelope to lower printing and mailing costs. Newspaper companies also print and distribute paper coupons together with newspapers for stores. Under such circumstances, a store still pays coupon distribution vendors for printing and distributing coupons without any guarantee of a desired outcome. In fact, many coupon packages mailed by coupon distribution vendors to consumers quickly end up in trashcans without being opened.

In the past several years, coupon distribution vendors like Groupon, Living Social, etc. have pushed coupons to consumers by sending emails to consumers with huge discounts as an attraction. First, these coupon distribution vendors negotiate with stores based on volume to obtain very good discounts for goods or services. These coupons are basically special prices because of group discounts. To guarantee large quantities to stores, coupon distribution vendors specify that the consumers purchase these coupons in advance and use these coupons before they expire.

There are many complaints from both consumers and stores about this type of coupon distribution method. For consumers, one of the main reasons for complaints is that consumers need to purchase the coupons in advance. In reality, after purchasing the coupons, some consumers may change their minds and do not need the purchased coupons anymore. Some consumers may not have a chance to use the purchased coupons before the coupons expire. Under such circumstances, the money spent on the coupons is totally wasted. Use of the purchased coupons before they expire may also add unnecessary pressure to the consumer's lives after purchasing such coupons. Therefore, consumers generally do not like to purchase coupons in advance. On the other hand, these coupon distribution vendors collect money from consumers in advance to make sure that (1) they can reach the quantities they have guaranteed to stores, and (2) they will get paid for their coupon distribution services before consumers change their minds.

Stores that issue coupons complain about paying coupon distribution vendors a significant amount of money in advance for distributing coupons to consumers. Furthermore, managing these coupons is difficult because a large quantity of coupons is pushed to consumers within a short period of time. For example, because a store cannot exactly predict when the coupons will be redeemed by consumers, the store may experience difficulties in managing their inventories. For example, restaurants that sell many coupons within a short period of time, may find that consumers redeem their coupons on busy evenings (e.g., on weekends or holidays). As a result, the restaurant is filled with many guests at discounted prices. Furthermore, prospective clients that are willing to pay full prices may not find available seating in the restaurant. In fact, many stores end up losing money after issuing coupons through these types of coupon distribution vendors.

Even for coupon distribution vendors, there is a risk because a store can close its business without honoring the coupons purchased by consumers from the coupon distribution vendors. Under such circumstances, coupon distribution vendors are obligated to refund the money back to the consumers that purchased the coupons from the coupon distribution vendors. Obviously, the current methods of coupon distribution have some drawbacks.

One aspect of the present disclosure introduces a new way to distribute coupons and resolve the conventional problems described above. In one aspect of the present disclosure, the AFTS computer system opens an account for a store and permits the store to upload promotional materials, including coupons, in electronic format. Because many mobile devices can take pictures, uploading photos of promotional items through the Internet is very easy today. In this configuration, the AFTS computer system has a web interface for stores to upload their promotional photos. Alternatively, the AFTS computer system may include a personal communication device application for stores to upload their promotional photos. The stores can also add descriptions about the photos for promotional purposes. As a result, the preparation period of a marketing campaign through the AFTS computer system can be as short as several minutes. A marketing campaign can be launched in near real time.

In one aspect of the present disclosure, the store sets a period of promotion (e.g., the effective period of the coupons). The store can provide an instruction to the AFTS computer system to start a promotion in real time. The instruction can be given through the Internet, an application on a personal communication device, a phone call, or other communication method. Upon receiving the instruction from the store, the AFTS computer system can send coupons and other promotional materials to account holders (i.e., members) of the AFTS computer system. The coupons and other promotional materials may be sent to account holders within a pre-determined distance from the store based on, for example, the geolocations of the personal communication devices of these account holders.

Alternatively, the coupons and promotional materials are available to account holders of the AFTS computer system upon their request for information. These coupons, other promotional materials and related information can be displayed on personal communication devices of the account holders of the AFTS computer system.

In one aspect of the present disclosure, the AFTS computer system receives geolocation information of a personal communication device of a consumer. The consumer may use his personal communication device to receive promotional information provided by the AFTS computer system. As noted, the promotional information may include coupons and other promotional items offered by stores near the consumer based on the geolocation of the personal communication device of the consumer.

Because the promotional information can be sent to the personal communication devices of consumers in real time, stores have better control of their inventories. Stores can put perishable goods or services on sale before it is too late. For example, if a restaurant has too many empty seats on a particular night at 7:00 pm, the restaurant can immediately send promotional information such as an electronic coupon through the AFTS computer system to attract consumers to the restaurant before 9:00 pm by ending this special promotion at 9:00 pm. As a result, one aspect of the present disclosure helps stores better manage their inventories. To avoid arguments regarding transactions conducted around the expiration time, in one aspect of the present disclosure, the AFTS computer system has an agreement with the store to allow a grace period (e.g., 30 minutes) in which the coupons are still effective after the expiration time defined by the store.

For example, a consumer may feel hungry at 7:30 pm. He opens an application on his personal communication device and a list of food options with special promotions near his location is displayed on his personal communication device.

In one aspect of the present disclosure, the location of the consumer can be determined by the geolocation of the personal communication device of the consumer. The location of the consumer can also be determined by information provided by the consumer.

In one aspect of the present disclosure, the consumer selects a store from a list of nearby stores and their promotions displayed on a personal communication device based on the geolocation of the personal communication device. The store identification information of the selected store may be sent to the AFTS computer system from the personal communication device of the consumer. The route direction from the geolocation of the personal communication device of the consumer to the store location may be displayed on the personal communication device of the consumer.

In one aspect of the present disclosure, the AFTS computer system identifies the consumer's AFTS account based on the identification information (e.g., caller ID, etc.) of the personal communication device of the consumer. The AFTS computer system can then send a passcode to the personal communication device of the consumer. The passcode may be randomly generated. In one aspect of the present disclosure, the passcode has a pre-defined lifetime. The passcode may be very short (e.g., 4 digits) so that the consumer can easily provide the passcode to a store through verbal communication, or an automatic checkout stand, without any confusion. As an option, the length of the passcode may be extended to reduce the chance of potential fraud.

In one aspect of the present disclosure, the passcode is displayed in a graphical format (e.g., 1 or 2 dimensional bar code) on the personal communication device of the consumer so that the store can read it through a scanner. The AFTS computer system may link the passcode and the consumer's AFTS account with the AFTS account of the store selected by the consumer. The AFTS computer system may store this information in a database.

Either the store or the consumer may select a coupon or other promotional item issued by the store. Multiple coupons or other promotional items can also be selected at the same time. This selection process can be accomplished through a device interface of the AFTS computer system inside the store and/or the personal communication device of the consumer. The information of the selected coupons or other promotional items is sent to the AFTS computer system. Alternatively, applicable coupons or other promotional items are automatically applied by the AFTS computer system without a selection process.

In one aspect of the present disclosure, the store inputs the original total charge amount without using a coupon or other promotional item. This original total amount is sent to the AFTS computer system. If the cashier terminal of the store is linked to the AFTS computer system, the original total amount can be automatically provided to the AFTS computer system.

In one aspect of the present disclosure, the AFTS computer system applies the selected coupons or other promotional items and derives a final payment amount, including applicable taxes and duties due from the consumer. This final payment amount can also be zero, which means free of charge, or a negative value, which means a rebate is available. This final payment amount can be sent to the device interface of the AFTS computer system inside the store, cashier terminal, and/or the personal communication device of the consumer. In one aspect of the present disclosure, either the consumer or the store inputs the passcode, which was received by the personal communication device of the consumer, into the store's device interface of the AFTS computer system or the cashier terminal when the consumer agrees to pay a final dollar amount.

The AFTS computer system can deduct the final payment amount from the consumer's AFTS account if (1) the passcode has not expired yet, (2) the passcode, the consumer's AFTS account and the store's AFTS account all match the pre-stored records inside the database when the passcode was issued, and (3) there are sufficient funds (including credits) in the consumer's AFTS account. Otherwise, the AFTS computer system rejects the transaction and informs the store and/or the consumer of the rejection.

In another aspect of the present disclosure, when the consumer agrees to pay the final payment amount, the consumer approves the transaction through a personal communication device and the approval is sent to the AFTS computer system from the personal communication device of the consumer. The AFTS computer system may deduct the final payment amount from the consumer's AFTS account after receiving the approval from the personal communication device of the consumer if there are sufficient funds (including credits) in the consumer's AFTS account.

In one aspect of the present disclosure, the AFTS computer system deducts a service fee from the final payment amount and transfers the balance (i.e., the final payment amount minus the service fee) into an AFTS account of the store. This service fee is charged for providing the coupon distribution service and payment transaction service to the store. The service fee can be transferred to a house account of the AFTS computer system because the fee is earned by the AFTS computer system. The funds in a house account of the AFTS computer system are owned and controlled by the AFTS computer system. This approach ensures that the operator of the AFTS computer system gets paid for providing its services.

An AFTS account of a consumer (or a store) can be funded by traditional financial instruments, electronic financial instruments, and credits by the AFTS computer system. The funds inside an AFTS account of a consumer (or a store) can be transferred out to other accounts at other financial institutions using traditional financial instruments, electronic financial instruments, and debits by the AFTS computer system.

As a result, both the store and the consumer rely on the AFTS computer system to (1) distribute the coupons to attract consumers in substantially real time, (2) find the best available purchase options for consumers in real time, and (3) complete the transactions based on the coupons in real time. Therefore, there is no incentive to bypass the AFTS computer system. The AFTS computer system is guaranteed to receive a service fee when a transaction between a consumer and a store is completed because the AFTS computer system controls the entire transaction process.

More importantly, consumers do not purchase any coupon or other promotional item in advance, and stores do not pay for any costs in advance of distributing coupons or other promotional items. Furthermore, stores are guaranteed an outcome when they spend money on marketing campaigns because the stores only pay fees for transactions completed as a result of the marketing campaigns. This is also an environment-friendly method because no paper is involved in the transaction. Stores can better manage their inventories and get the best value out of perishable goods or services through a timely promotion. An aspect of the disclosure of the present disclosure provides an effective and efficient way to distribute coupons or other promotional items.

Although coupons are used in the above examples, other electronic financial instruments can also be used in similar manner, according to further aspects of the present disclosure.

Because all transactions conducted by the AFTS computer system are based on the AFTS accounts and the AFTS accounts can be financed by traditional financial instruments, payees of the AFTS computer system accept all traditional financial instruments used by payers. A payee will receive funds through its AFTS account without knowing where the AFTS computer system obtains funds from the payer. As a result, a payer can travel worldwide without worrying about whether his financial instruments are accepted worldwide. A payee can conduct business with all payers without worrying about whether the payers' financial instruments are acceptable.

In summary, many different ways are disclosed in the present specification to protect a financial transaction against fraud. A particular aspect or a particular combination of aspects can be applied for a financial transaction based on the risk involved in the financial transaction. Alternatively, the choice of a particular aspect or a particular combination of aspects can be based on other commercial reasons.

One of many possible combinations is described below as an example. The computer system of the Anti-Fraud Financial Transactions System ("AFTS") 500 and a network 600, such as the Internet, enable a consumer 100, a financial institution 200, a retail store 300 and an online merchant 400 to conduct secure financial transactions as shown in FIG. 1.

Figure 2:
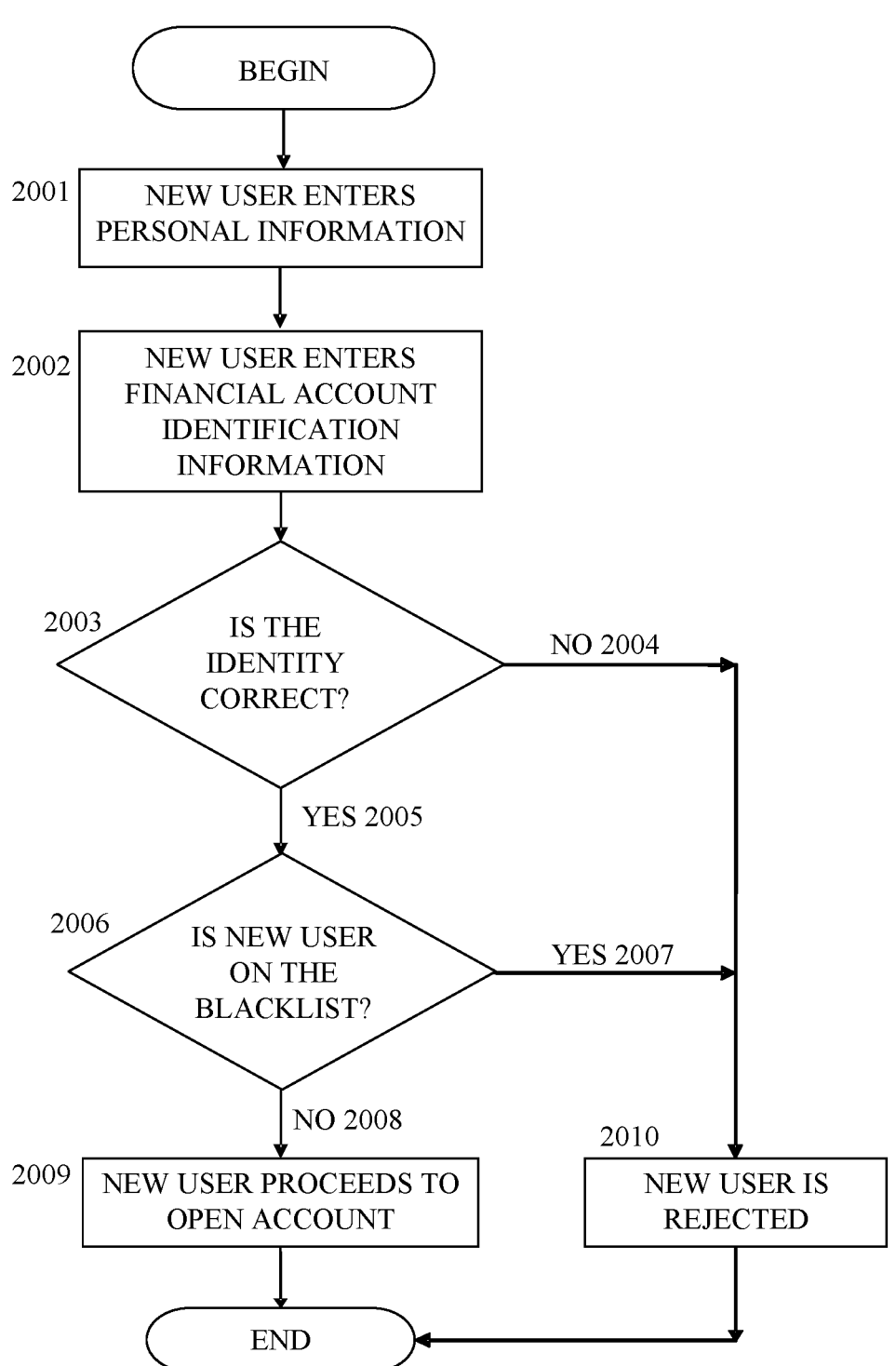
FIG. 2 is a flowchart of an example process, indicating how a new user registers with the computer system of AFTS as shown in FIG. 1 according to one aspect of the present disclosure.

Reference should now be made to the flowchart of FIG. 2 in combination with the system diagram of FIG. 1, which together illustrate how a consumer can open an account with the AFTS computer system 500.

First (block 2001), a consumer (i.e., new user) 100 provides her personal information to a device interface of the AFTS. The personal information may include personal identification information and the identification information of a personal communication device of the consumer 100. Then (block 2002), the consumer 100 sends her financial account identification to the AFTS computer system 500. The consumer's financial account provides funding to the AFTS account of the consumer 100. The AFTS authenticates the identity of the consumer 100 by the conventional standards used in the financial industry.

According to the authentication result, the device interface may take a different action (decision block 2003). If the consumer's identity is not correct (NO branch 2004), for example, because the identity of the consumer 100 cannot be authenticated, the device interface rejects the consumer 100 attempt to open an account (block 2010).

If the consumer's identity is correct (YES branch 2005), for example because an identity of the consumer 100 can be authenticated, the AFTS computer system 500 determines whether the consumer 100 is on the blacklist used by the AFTS (decision block 2006). This blacklist may include the information provided by government agencies (e.g., Office of Foreign Assets Control, etc.) and commercial organizations.

If the consumer 100 is on the blacklist (YES branch 2007), the consumer is prevented from opening an account (block 2010). If the consumer 100 is not on the blacklist (NO branch 2008), the consumer is permitted to proceed with completing the process and opening an account with the AFTS computer system 500 (block 2009).

After the consumer 100 opens an account with the AFTS computer system 500, the consumer 100 can conduct secure financial transactions with a retail store 300 at a point of sale.

Figure 3A:
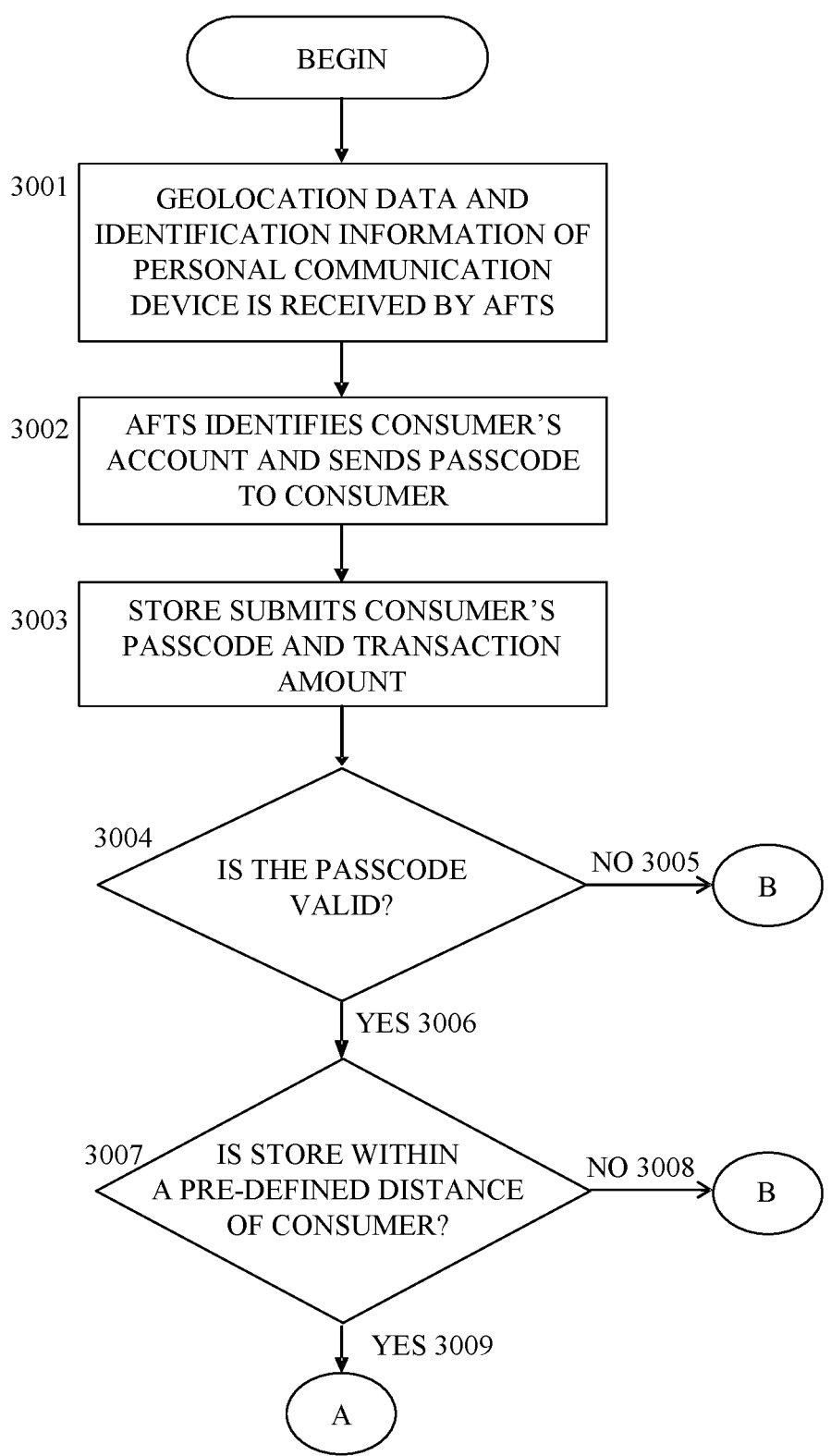
FIG. 3A and FIG. 3B are flowcharts of an example process, indicating how the system shown in FIG. 1 enables a consumer to conduct secure financial transactions with a retail store at point of sale according to one aspect of the present disclosure.
Figure 3B:
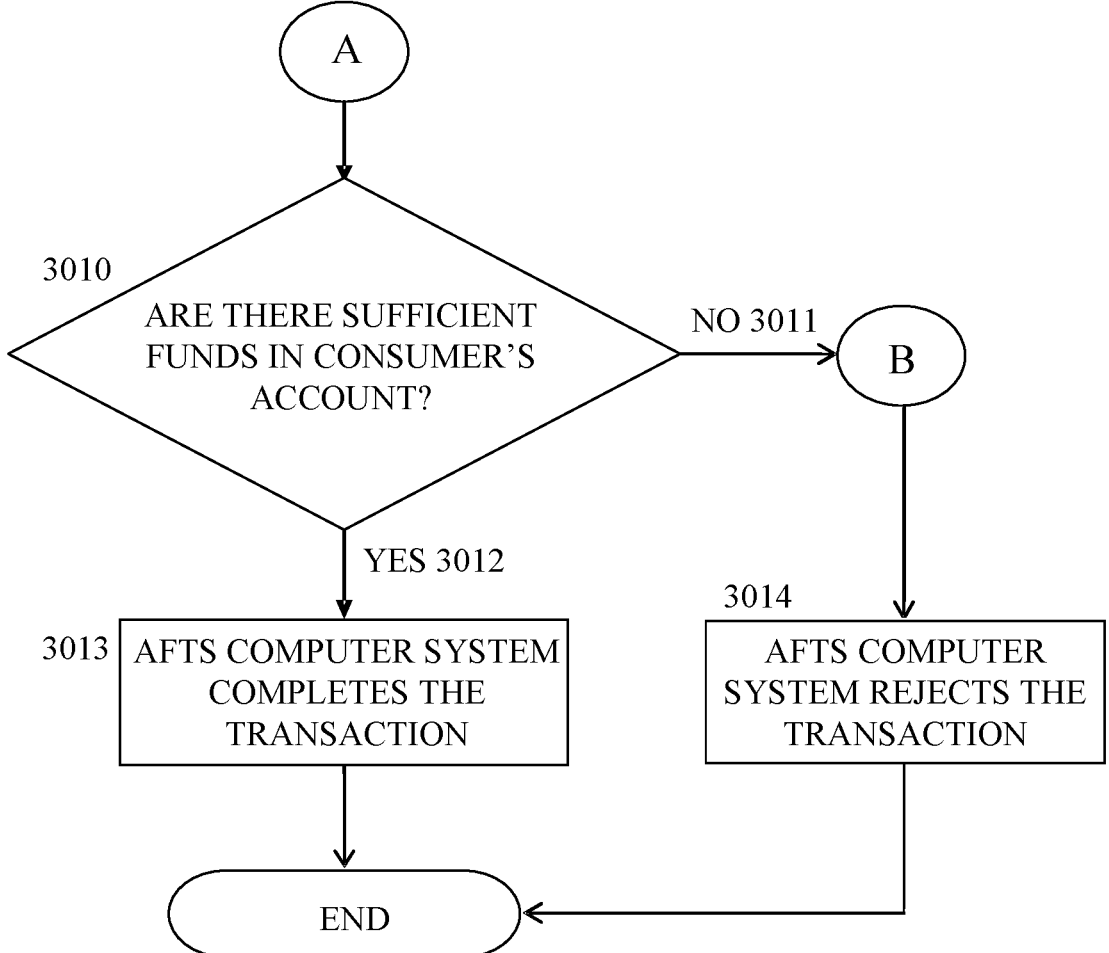

The flowchart in FIGS. 3A and 3B in combination with the system diagram of FIG. 1 illustrate how these transactions are conducted.

The AFTS computer system 500 receives geolocation information of the personal communication device of the consumer 100 and the identification information of the personal communication device (e.g., caller ID) of the consumer 100 (block 3001). The AFTS computer system 500 uses the identification information of the personal communication device to identify the AFTS account of the consumer 100 and sends a passcode to the personal communication device of the consumer 100 (block 3002). The consumer 100 provides the retail store 300 with the passcode and the retail store 300 submits the passcode and a transaction amount to the AFTS computer system 500 via the network 600 (block 3003).

The AFTS computer system 500 determines if the passcode is valid (decision block 3004). If the passcode is not valid (NO branch 3005), the AFTS computer system 500 rejects the transaction (block 3014). If the passcode is valid (YES branch 3006), the AFTS computer system 500 determines if the distance between the retail store 300 and the geolocation of the personal communication device of the consumer 100 is within a pre-defined distance (decision block 3007).

If the distance between the consumer 100 and the retail store 300 is not within the pre-defined distance (NO branch 3008), the AFTS computer system 500 rejects the transaction (block 3014). If the distance between the consumer 100 and the retail store 300 is within the pre-defined distance (YES branch 3009), the AFTS computer system 500 determines whether there is a sufficient amount of funds (including credits) in the consumer's AFTS account for the transaction (decision block 3010).

If funds are insufficient (NO branch 3011), the AFTS computer system 500 rejects the transaction (block 3014). If there are sufficient funds (YES branch 3012), the AFTS computer system 500 completes the transaction (block 3013).

Figure 4A:
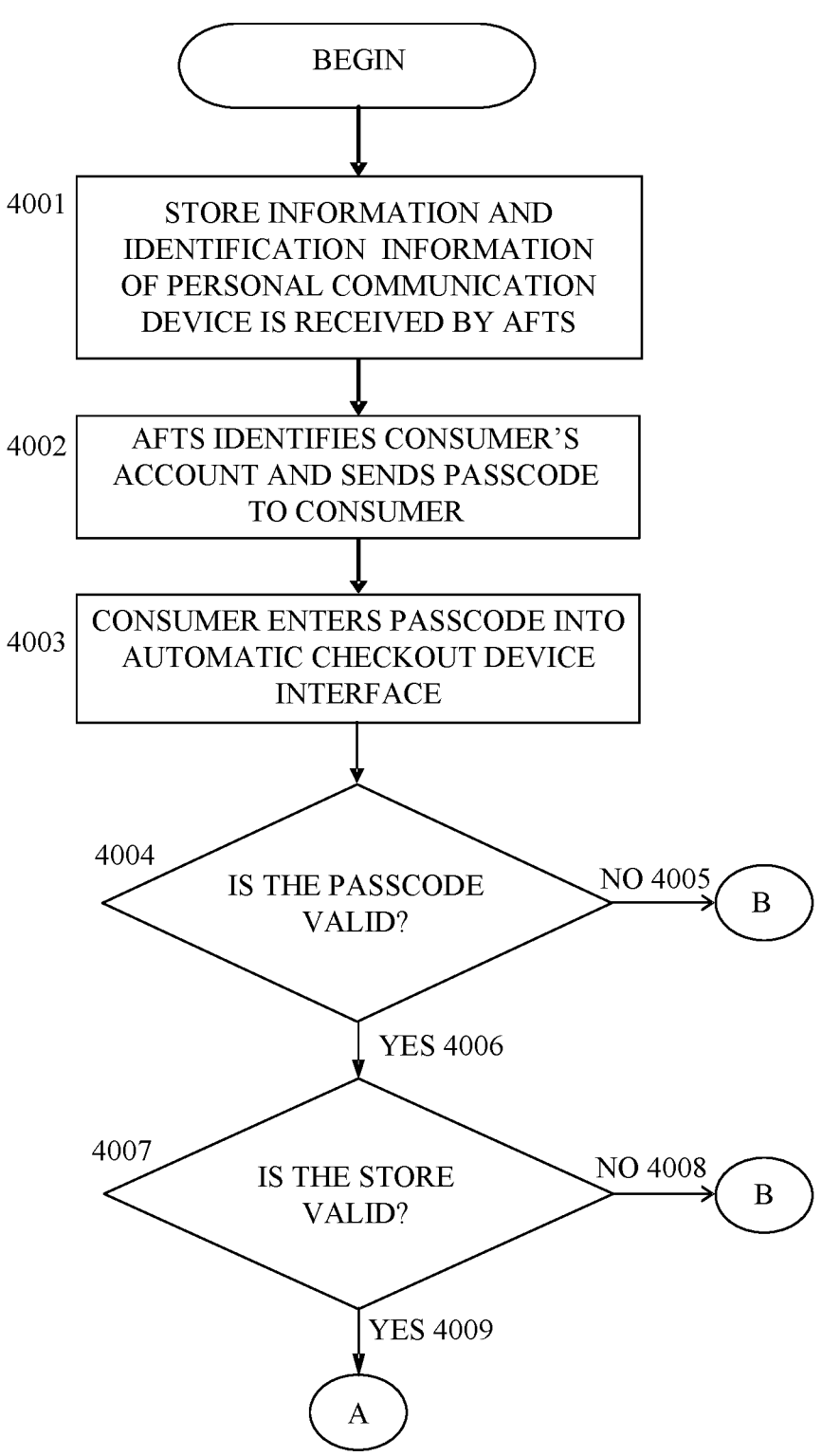
FIG. 4A and FIG. 4B are flowcharts of an example process, indicating how the system shown in FIG. 1 enables a consumer to conduct secure financial transactions with a retail store through an automatic checkout stand according to one aspect of the present disclosure.
Figure 4B:
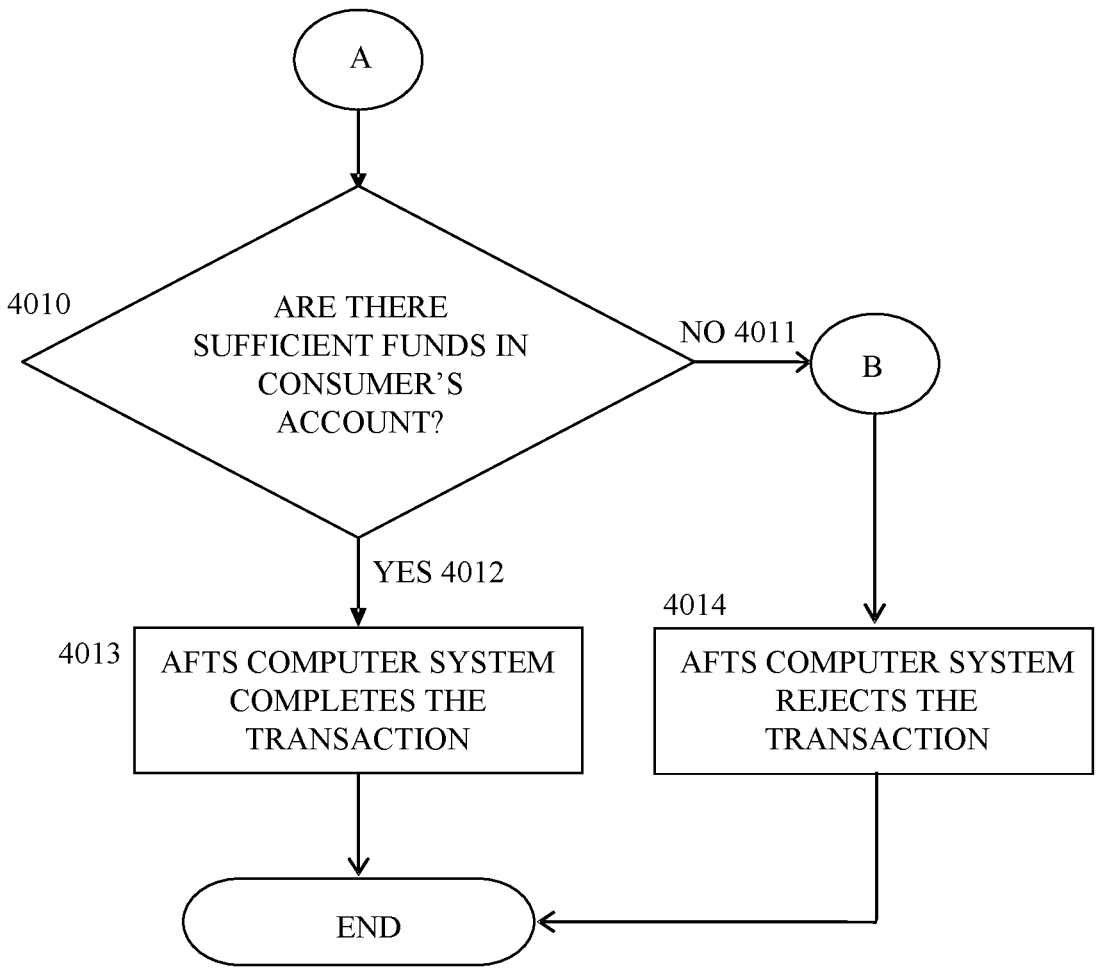

Sometimes, a retail store 300 may permit the consumer 100 to interact directly with a device interface in the retail store 300. In addition, an automatic checkout stand may expect the consumer 100 to interact directly with the checkout stand. Under such circumstances, the flowchart in FIGS. 4A and 4B in combination with the system diagram of FIG. 1 illustrate how these transactions can be conducted on the AFTS.

A consumer 100 selects a store on her personal communication device. The AFTS computer system 500 receives, from the personal communication device of the consumer 100, (1) the selected store information and (2) the identification information of the personal communication device of the consumer 100 (block 4001). The AFTS computer system 500 uses the identification information of the personal communication device to identify the AFTS account of the consumer 100 and sends a passcode to the personal communication device of the consumer 100 (block 4002). The consumer 100 enters the passcode into a device interface of an automatic checkout stand of the retail store 300, and the passcode is sent to the AFTS computer system 500 from the retail store 300 via the network 600 (block 4003).

The AFTS computer system 500 determines if the passcode is valid (decision block 4004). If the passcode is not valid (NO branch 4005), the AFTS computer system 500 rejects the transaction (block 4014). If the passcode is valid (YES branch 4006), the AFTS computer system 500 determines if the store from which the passcode was received matches the store which the consumer 100 has selected (decision block 4007).

If the store from which the passcode was received does not match the store that the consumer 100 selected (NO branch 4008), the AFTS computer system 500 rejects the transaction (block 4014). If the store from which the passcode was received matches the store that the consumer 100 selected (YES branch 4009), the AFTS computer system 500 determines whether there are sufficient funds (including credits) in the consumer's AFTS account to complete the transaction (decision block 4010).

If there are insufficient funds (NO branch 4011), the AFTS computer system 500 rejects the transaction (block 3014). If there are sufficient funds (YES branch 4012), the AFTS computer system 500 completes the transaction (block 4013).

Figure 5A:
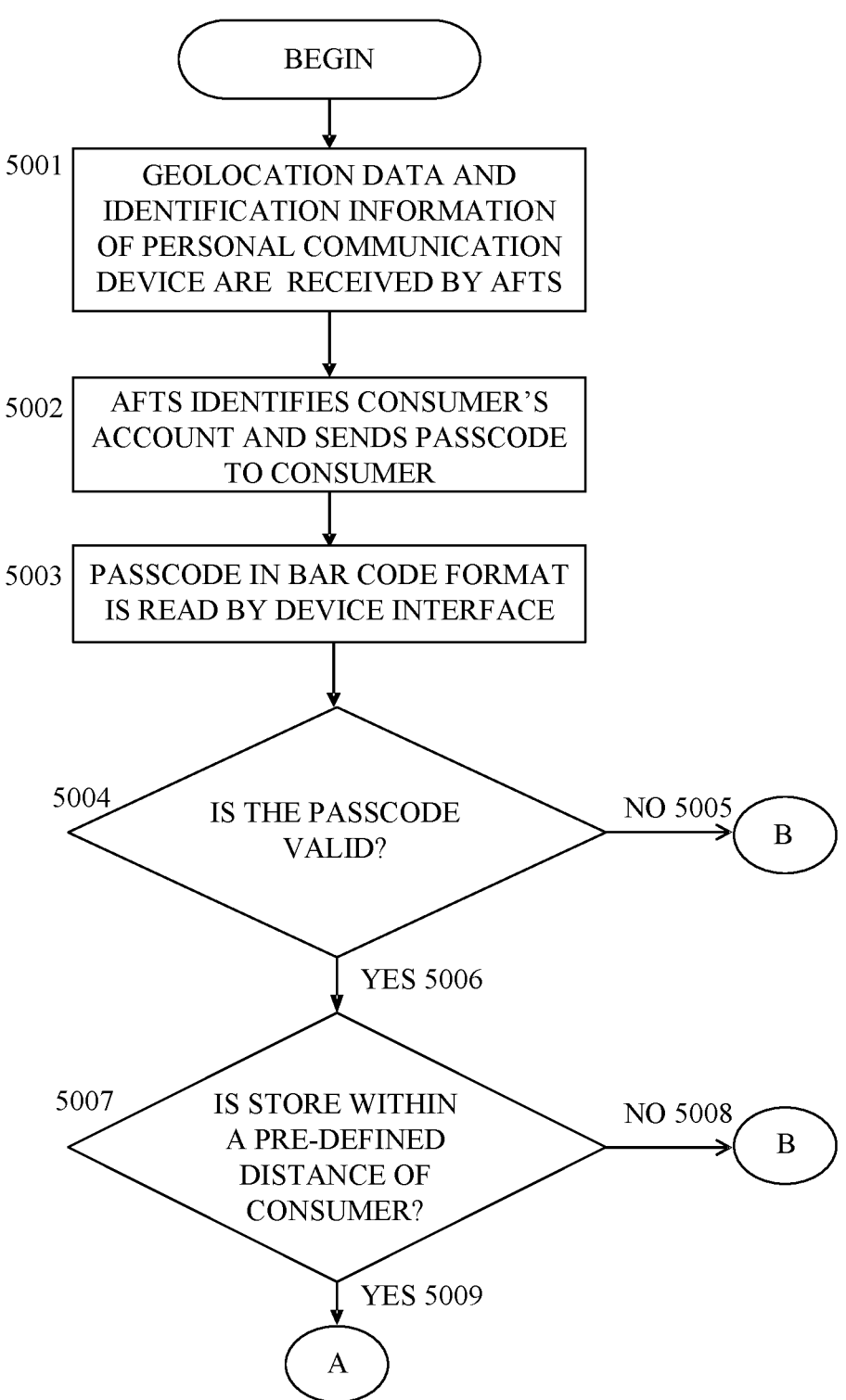
FIG. 5A and FIG. 5B are flowcharts of an example process, indicating how the system shown in FIG. 1 enables a consumer to conduct secure financial transactions with a retail store through his/her personal communication device according to one aspect of the present disclosure.
Figure 5B:
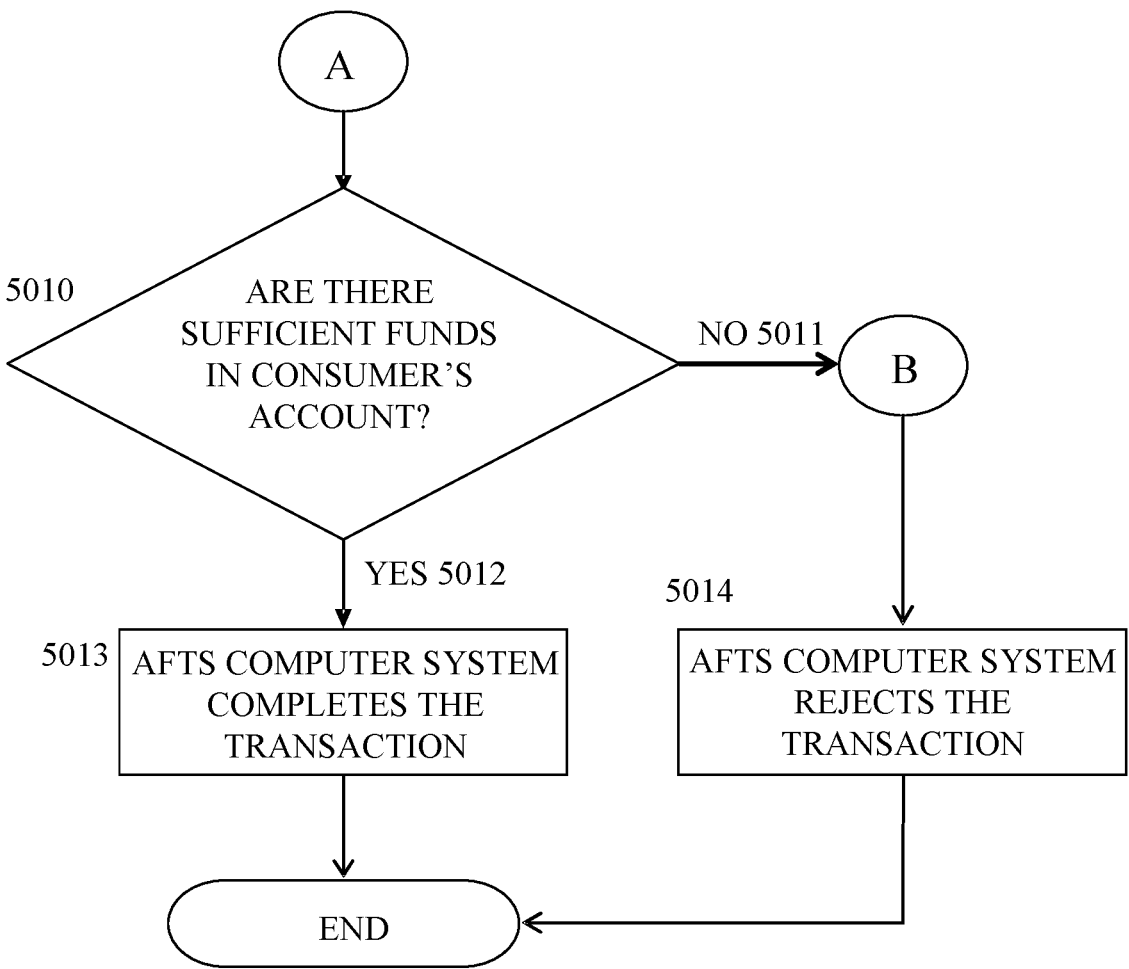

Sometimes, to reduce verbal communications or manual data entry during a transaction, a consumer 100 can use a graphical pattern (e.g., bar code) to complete a secure financial transaction. The graphic pattern can be produced by the AFTS computer system 500 and sent to the personal communication device of the consumer 100. Alternatively, the graphical pattern can be produced by the personal communication device of the consumer 100 based on the information sent from the AFTS computer system 500. The graphical pattern can be one dimensional, two dimensional or three-dimensional. The flowchart in FIGS. 5A and 5B in combination with the system diagram of FIG. 1 illustrate how this kind of transaction can be conducted on the AFTS. Although a bar code is used in this example, other type of graphical patterns can also be used to achieve the same goal.

The AFTS computer system 500 receives geolocation information of the personal communication device of the consumer 100 and the identification information of the personal communication device of the consumer 100 (block 5001). The AFTS computer system 500 uses the identification information of the personal communication device to identify the AFTS account of the consumer 100 and sends a passcode to the personal communication device of the consumer 100 (block 5002). The passcode is presented in a bar code format so that a device interface of the AFTS at the retail store 300 can scan the bar code, translate the bar code into a passcode, and send the passcode to the AFTS computer system 500 via the network 600 (block 5003). The bar code can be produced by the AFTS computer system 500 and then sent to the personal communication device of the consumer 100. Alternatively, the bar code can be produced by the personal communication device of the consumer 100 based on the information provided by the AFTS computer system 500.

The AFTS computer system 500 determines if the passcode is valid (decision block 5004). If the passcode is not valid (NO branch 5005), the AFTS computer system 500 rejects the transaction (block 5014). If the passcode is valid (YES branch 5006), the AFTS computer system 500 then determines if the distance between the retail store 300 and the geolocation provided by the personal communication device of the consumer 100 is within a pre-defined distance (decision block 5007).

If the distance between the consumer 100 and the retail store 300 is not within the pre-defined distance (NO branch 5008), the AFTS computer system 500 rejects the transaction (block 5014). If the distance between the consumer 100 and the retail store 300 is within the pre-defined distance (YES branch 5009), the AFTS computer system 500 then determines whether there are sufficient funds (including credits) in the consumer's AFTS account to complete the transaction (decision block 5010).

If there are insufficient funds (NO branch 5011), the AFTS computer system 500 rejects the transaction (block 5014). If there are sufficient funds (YES branch 5012), the AFTS computer system 500 completes the transaction (block 5013).

Figure 6A:
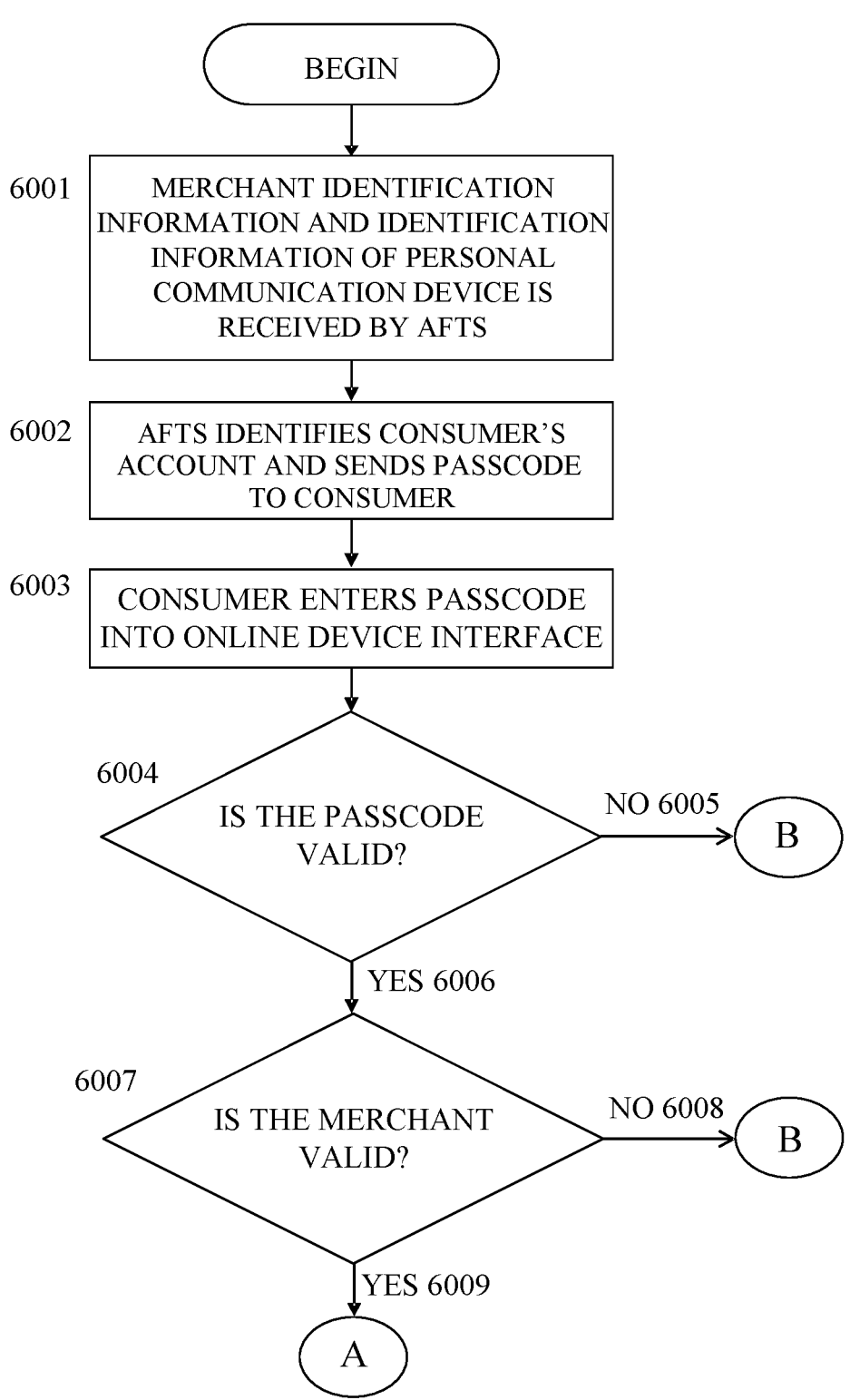
FIG. 6A and FIG. 6B are flowcharts of an example process, indicating how the system shown in FIG. 1 enables a consumer to conduct secure financial transactions with an online merchant through a device interface according to one aspect of the present disclosure.
Figure 6B:
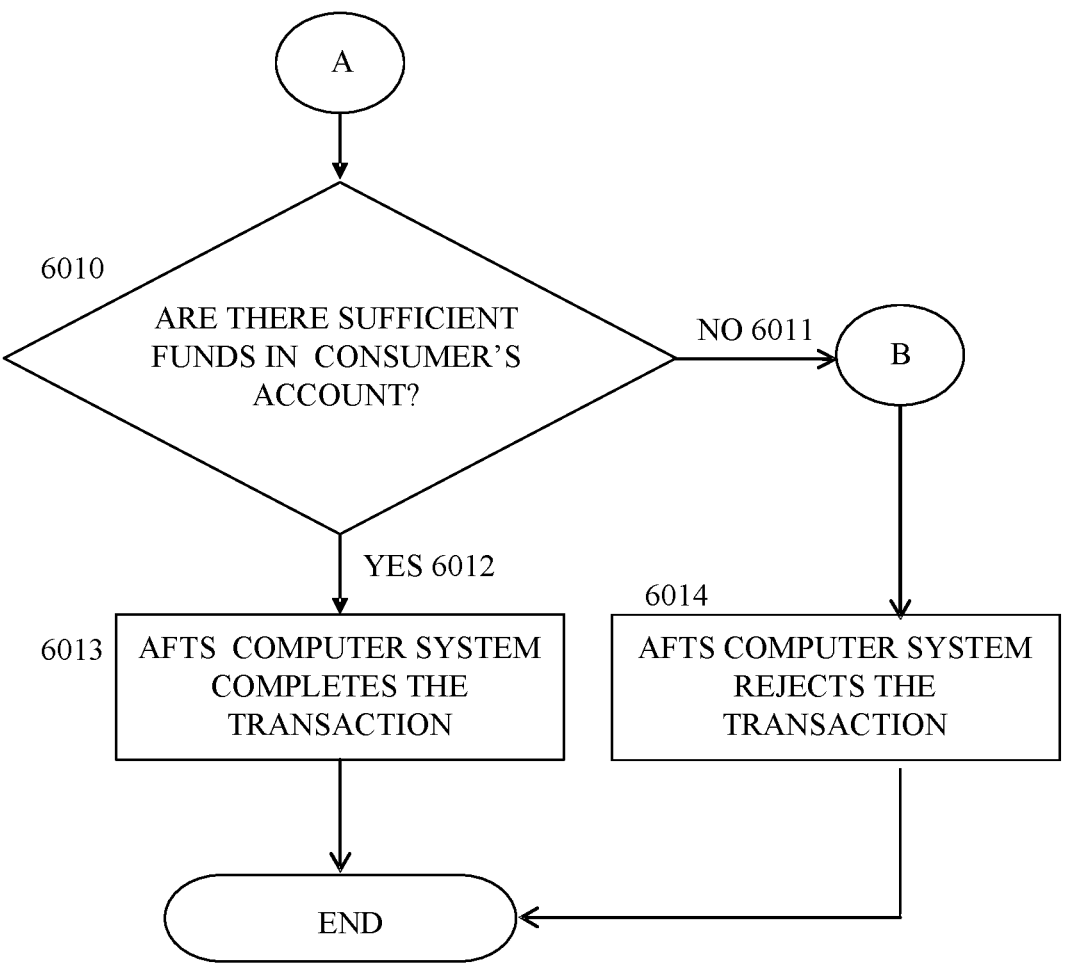

Furthermore, for online commercial activities, a consumer 100 may interact directly with the device interface provided by the online merchant 400 via the network 600. Under such circumstances, the flowchart in FIGS. 6A and 6B in combination with the system diagram of FIG. 1 illustrate how these transactions can be conducted on the AFTS.

The device interface of the online merchant 400 provides identification information of the merchant. The AFTS computer system 500 receives merchant identification information from the consumer 100 and the identification information of the personal communication device of the consumer 100 (block 6001). The AFTS computer system 500 uses the identification information of the personal communication device to identify the AFTS account of the consumer 100 and sends a passcode to the personal communication device of the consumer 100 (block 6002). The consumer 100 enters the passcode into the device interface provided by the online merchant 400 (block 6003).

The AFTS computer system 500 determines if the passcode is valid (decision block 6004). If the passcode is not valid (NO branch 6005), the AFTS computer system 500 rejects the transaction (block 6014). If the passcode is valid (YES branch 6006), the AFTS computer system 500 then determines if the merchant from which the passcode was received matches the merchant identification information received from the consumer 100 (decision block 6007).

If the merchant from which the passcode was received does not match the merchant identification information received from the consumer 100 (NO branch 6008), the AFTS computer system 500 rejects the transaction (block 6014). If the merchant from whom the passcode was received matches the merchant identification information received from the consumer 100 (YES branch 6009), the AFTS computer system 500 determines whether there are sufficient funds (including credits) in the consumer's AFTS account to complete the transaction (decision block 6010).

If there are insufficient funds (NO branch 6011), the AFTS computer system 500 rejects the transaction (block 6014). If there are sufficient funds (YES branch 6012), the AFTS computer system 500 completes the transaction (block 6013).

Although transactions between a consumer 100 and a retail store 300 or between a consumer 100 and an online merchant 400 are used in the above examples, transactions between a consumer 100 and a financial institution 200, either in person or online, can also be conducted in a similar manner. As a result, a geolocation of a party that conducts a transaction or information of a merchant selected by a consumer can be used to simplify the transactional process and enhance the security of the transaction in aspects of the present disclosure. For example, two consumers can also use aspects of the present disclosure to conduct peer-to-peer transactions. Those skilled in the art to which this disclosure pertains can appreciate that the present disclosure can be applied to many different types of financial transactions between different kinds of parties.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The aspects described in this disclosure can be assembled to form a variety of applications based on the need. Those skilled in the art and technology to which this disclosure pertains can appreciate that alterations and changes in the described structure may be practiced without meaningfully departing from the principal, spirit, and scope of this disclosure. Such alterations and changes should not be construed as deviations from the present disclosure.

What is claimed is:

1. A transaction computer system for conducting a transaction without a traditional financial instrument that facilitates payment between a payer and a payee, comprising:

one or more processors; and memory coupled with the one or more processors and storing instructions operable, when executed by the one or more processors, to cause the transaction computer system:

to receive, at the transaction computer system for completing transactions on behalf of the payer associated with a payer computer system, an identification message indicating device identification information of the payer computer system and a first geolocation indicating a physical location of the payer computer system, the device identification information comprising device specific information that uniquely identifies the payer computer system from other computer systems, the device identification information being different than personal identification information and personal financial information of the payer, and the transaction computer system being remotely located from the payer computer system;

to identify, at the transaction computer system, a first account of the payer corresponding to the device identification information, an account number of the first account being different from the device identification information;

to generate, at the transaction computer system, a pass code for conducting the transaction with the payee based on identifying the first account, the pass code having a pre-defined life time, and a length of the passcode being less than a length of the account number;

to associate, at the transaction computer system, the passcode and the first geolocation with the first account based on generating the passcode;

to transmit, from the transaction computer system to the payer computer system, the passcode;

to receive, at the transaction computer system from a payee computer system, the passcode previously transmitted to the payer computer system and a transaction value of a transaction between the payer and the payee associated with the payee computer system, the payee computer system receiving the passcode via a communication signal transmitted from the payer computer system, and the payer computer system receiving the passcode in lieu of receiving a financial instrument from the payee;

to identify, at the transaction computer system, the first account based on receiving the passcode from the payee computer system;

to calculate, at the transaction computer system, a first distance between the first geolocation and a second geolocation associated with a physical location of the payee computer system based on identifying the first account; and to determine, at the transaction computer system, whether to verify the transaction between the payer and the payee based on the first distance:

when the first distance is less than or equal to a first distance threshold, the transaction is verified and an amount of money indicated in the transaction value is transferred from the first account to a second account of the payee, and when the first distance is greater than the first distance threshold, the transaction is rejected.

2. The apparatus of claim 1, in which the lifetime associated with the passcode is fixed.

3. The apparatus of claim 1, in which the passcode is randomly generated at the transaction computer system.

4. The apparatus of claim 1, in which the first account is funded by cash, check, credit card, debit card, ATM card, prepaid card, gift card, wire transfer, ACH transfer, credit, and/or other financial instruments.

5. The apparatus of claim 1, in which funds inside the first account may be transferred out through cash, check, credit card, debit card, ATM card, prepaid card, gift card, wire transfer, ACH transfer, debit, and/or other financial instruments.

6. The apparatus of claim 1, in which execution of the instructions further cause the apparatus:

to receive, from the transaction computer system, a request to approve the transaction based on transmitting the passcode;

to display, at a display unit, a message requesting the payer to approve the transaction based on receiving the request; and to transmit, to the transaction computer system, an approval of the transaction based on receiving approval from the payer.

7. The apparatus of claim 1, in which execution of the instructions further cause the apparatus to receive, from the transaction computer system, a message informing the payer that the amount of money has been transferred from the first account of the payer.

8. A method for verifying a transaction at a transaction computer system, comprising:

receiving, at the transaction computer system for completing transactions on behalf of a payer associated with a payer computer system, an identification message indicating device identification information of the payer computer system and a first geolocation indicating a physical location of the payer computer system, the device identification information comprising device specific information that uniquely identifies the payer computer system from other computer systems, the device identification information being different than personal identification information and personal financial information of the payer, and the transaction computer system being remotely located from the payer computer system;

identifying, at the transaction computer system, a first account of the payer corresponding to the device identification information, an account number of the first account being different from the device identification information;

generating, at the transaction computer system, a pass code for conducting the transaction with a payee based on identifying the first account, the pass code having a pre-defined life time, and a length of the passcode being less than a length of the account number;

associating, at the transaction computer system, the passcode and the first geolocation with the first account based on generating the passcode;

transmitting, from the transaction computer system to the payer computer system, the passcode;

receiving, at the transaction computer system from a payee computer system, the passcode previously transmitted to the payer computer system and a transaction value of a transaction between the payer and the payee associated with the payee computer system, the payee computer system receiving the passcode via a communication signal transmitted from the payer computer system, and the payer computer system receiving the passcode in lieu of receiving a financial instrument from the payee;

identifying, at the transaction computer system, the first account based on receiving the passcode from the payee computer system;

calculating, at the transaction computer system, a first distance between the first geolocation and a second geolocation associated with a physical location of the payee computer system based on identifying the first account; and determining, at the transaction computer system, whether to verify the transaction between the payer and the payee based on the first distance:

when the first distance is less than or equal to a first distance threshold, the transaction is verified and an amount of money indicated in the transaction value is transferred from the first account to a second account of the payee, and when the first distance is greater than the first distance threshold, the transaction is rejected.

9. The method of claim 8, in which the lifetime associated with the passcode is fixed.

10. The method of claim 8, in which the passcode is randomly generated at the transaction computer system.

11. The method of claim 8, in which the first account is funded by cash, check, credit card, debit card, ATM card, prepaid card, gift card, wire transfer, ACH transfer, credit, and/or other financial instruments.

12. The method of claim 8, in which funds inside the first account may be transferred out through cash, check, credit card, debit card, ATM card, prepaid card, gift card, wire transfer, ACH transfer, debit, and/or other financial instruments.

13. The method of claim 8, further comprising:

receiving, from the transaction computer system, a request to approve the transaction based on transmitting the passcode;

displaying, at a display unit, a message requesting the payer to approve the transaction based on receiving the request; and transmitting, to the transaction computer system, an approval of the transaction based on receiving approval from the payer.

14. The method of claim 8, further comprising receiving, from the transaction computer system, a message informing the payer that the amount of money has been transferred from the first account of the payer.

* * * * *